US012461467B2

(12) United States Patent
Nagai et al.

(10) Patent No.: US 12,461,467 B2
(45) Date of Patent: Nov. 4, 2025

(54) CARRIER FOR ELECTROSTATIC IMAGE DEVELOPMENT, ELECTROSTATIC IMAGE DEVELOPER, PROCESS CARTRIDGE, IMAGE FORMING APPARATUS, AND IMAGE FORMING METHOD

(71) Applicant: FUJIFILM Business Innovation Corp., Tokyo (JP)

(72) Inventors: Ryo Nagai, Kanagawa (JP); Yosuke Tsurumi, Kanagawa (JP); Yasuo Kadokura, Kanagawa (JP); Moegi Iguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/785,270

(22) Filed: Jul. 26, 2024

(65) Prior Publication Data

US 2025/0076783 A1 Mar. 6, 2025

(51) Int. Cl.
*G03G 15/08* (2006.01)

(52) U.S. Cl.
CPC ..... *G03G 15/0818* (2013.01); *G03G 15/0865* (2013.01)

(58) Field of Classification Search
CPC ............... G03G 9/1133; G03G 9/1139; G03G 15/0818; G03G 15/0865
USPC .......................................................... 399/279
See application file for complete search history.

(56) References Cited

U.S. PATENT DOCUMENTS

| | | | | |
|---|---|---|---|---|
| 5,932,387 | A | 8/1999 | Yamamoto et al. | |
| 9,740,130 | B2 * | 8/2017 | Fukushima .......... | G03G 9/1133 |
| 2023/0288828 | A1 * | 9/2023 | Kadokura ............ | G03G 9/1139 |

FOREIGN PATENT DOCUMENTS

| | | | |
|---|---|---|---|
| JP | 3979588 | B2 | 9/2007 |
| JP | 2012-063438 | A | 3/2012 |
| JP | 2013137362 | * | 7/2013 |
| JP | 2018-084608 | A | 5/2018 |
| JP | 6879453 | B2 | 6/2021 |

OTHER PUBLICATIONS

Apr. 8, 2025 Search Report issued in European Patent Application No. 24192021.4.

* cited by examiner

*Primary Examiner* — Hoan H Tran
(74) *Attorney, Agent, or Firm* — Oliff PLC

(57) ABSTRACT

A carrier for electrostatic image development includes: a core material; and a resin coating layer that covers the core material and contains a resin and carbon black particles. The resin coating layer has an average thickness denoted as B μm and contains aggregates of the carbon black particles, the aggregates having equivalent circle diameters denoted as A μm, the aggregates satisfying formula (1) below. In a cross section of the resin coating layer, the ratio of the total area of the aggregates satisfying formula (1) below to the total area of the resin coating layer is 10% or more and 50% or less:

$$0.2\times B\leq A\leq 0.8\times B \quad \text{Formula (1).}$$

20 Claims, 2 Drawing Sheets

CARRIER FOR ELECTROSTATIC IMAGE DEVELOPMENT, ELECTROSTATIC IMAGE DEVELOPER, PROCESS CARTRIDGE, IMAGE FORMING APPARATUS, AND IMAGE FORMING METHOD

CROSS-REFERENCE TO RELATED APPLICATIONS

This application is based on and claims priority under 35 USC 119 from Japanese Patent Application No. 2023-143584 filed Sep. 5, 2023.

BACKGROUND

(i) Technical Field

The present disclosure relates to a carrier for electrostatic image development, an electrostatic image developer, a process cartridge, an image forming apparatus, and an image forming method.

(ii) Related Art

Japanese Unexamined Patent Application Publication No. 2012-063438 discloses a carrier for electrostatic latent image development that includes core particles and a coating layer that covers the surfaces of the core particles. The coating layer contains: a resin obtained by subjecting a copolymer including a monomer having a specific structure to heat treatment; and electrically conductive particles. The ratio D/h of the diameter D of the dispersed electrically conductive particles to the average thickness h of the coating layer is 0.001 or more and 5 or less.

Japanese Unexamined Patent Application Publication No. 2018-084608 discloses a carrier for an electrostatic latent image developer that includes ferrite core particles and a coating layer that covers the ferrite core particles. The coating layer contains at least carbon black, inorganic particles, and a resin. In the coating layer, the fine inorganic particles have a concentration gradient in the thickness direction, and the carbon black also has a concentration gradient in the thickness direction. The volume percent concentration of the inorganic particles increases toward the outer surface of the coating layer, and the volume percent concentration of the carbon black decreases toward the outer surface of the coating layer. The change in the amount of water adsorbed on the carrier before and after storage in a 40° C./70% RH environment is 0.0040% or less.

SUMMARY

Aspects of non-limiting embodiments of the present disclosure relate to a carrier for electrostatic image development that allows both a further improvement in fine line reproducibility in an image that is formed using an image forming apparatus when the apparatus is operated after standing at high temperature and high humidity for a long time and a further reduction in the occurrence of color fading at edges of high-density images continuously formed at low temperature and low humidity, as compared to those when the ratio of the total area of aggregates satisfying formula (1) is less than 10% or more than 50%.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a carrier for electrostatic image development including:

a core material; and a resin coating layer that covers the core material and contains a resin and carbon black particles, wherein the resin coating layer has an average thickness denoted as B μm and contains aggregates of the carbon black particles, the aggregates having equivalent circle diameters denoted as A μm, the aggregates satisfying formula (1) below, and wherein, in a cross section of the resin coating layer, the ratio of the total area of the aggregates satisfying formula (1) below to the total area of the resin coating layer is 10% or more and 50% or less:

$$0.2 \times B \leq A \leq 0.8 \times B. \qquad \text{Formula (1)}$$

BRIEF DESCRIPTION OF THE DRAWINGS

An exemplary embodiment of the present disclosure will be described in detail based on the following figures, wherein.

DETAILED DESCRIPTION

Figure 1:
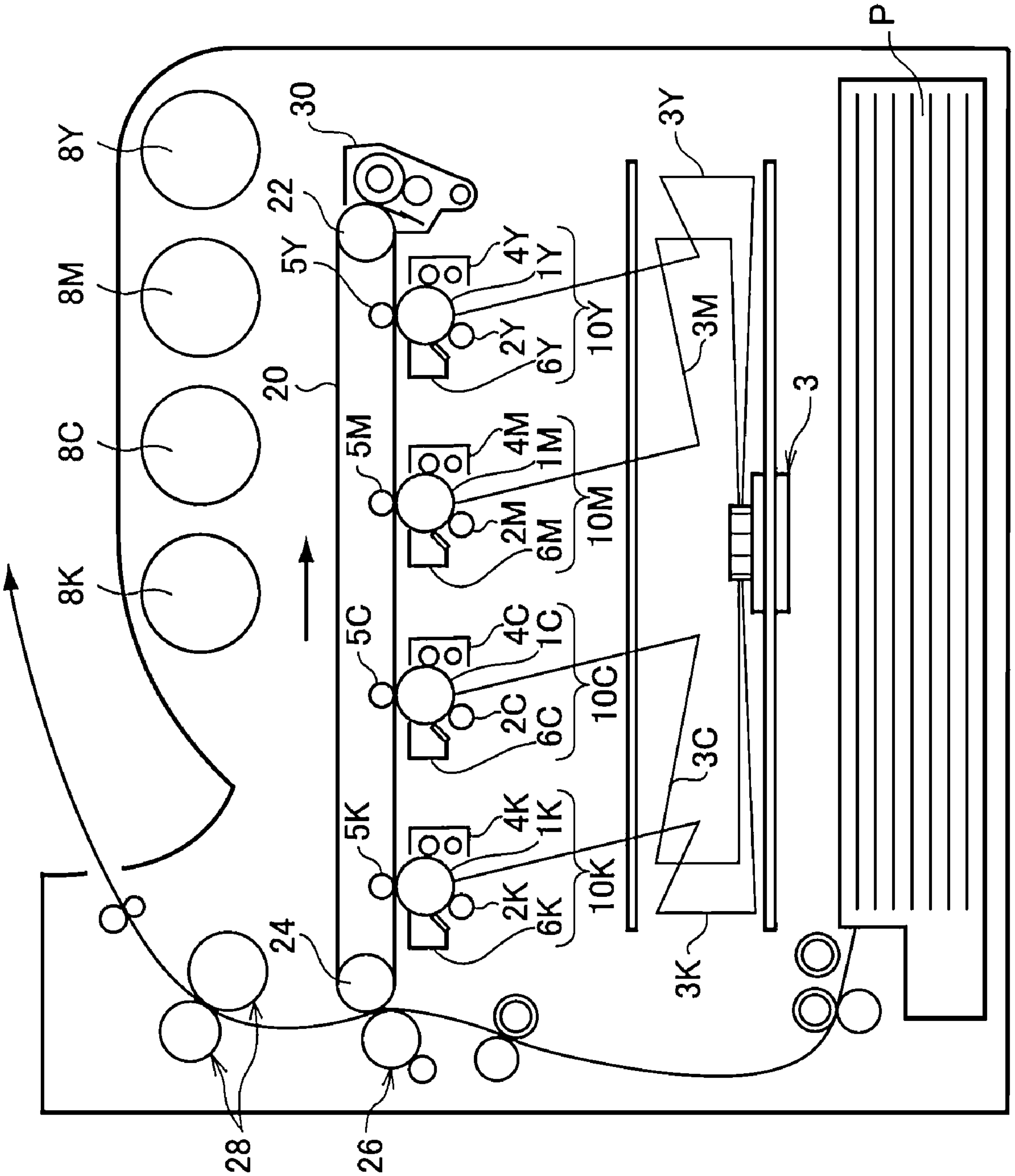
FIG. 1 is a schematic configuration diagram showing an example of an image forming apparatus according to the exemplary embodiment.

An exemplary embodiment of the disclosure will be described below. The description, Examples, etc. are illustrative of the exemplary embodiment and are not intended to limit the scope of the disclosure.

In the present disclosure, a numerical range represented using "to" means a range including the numerical values before and after the "to" as the minimum value and the maximum value, respectively.

In a set of numerical ranges expressed in a stepwise manner in the present disclosure, the upper or lower limit in one numerical range may be replaced with the upper or lower limit in another numerical range in the set. Moreover, in a numerical range described in the present disclosure, the upper or lower limit in the numerical range may be replaced with a value indicated in an Example.

In the present disclosure, the term "step" is meant to include not only an independent step but also a step that is not clearly distinguished from other steps, so long as the prescribed purpose of the step can be achieved.

When the exemplary embodiment in the present disclosure is explained with reference to the drawings, the structure of the exemplary embodiment is not limited to the structures shown in the drawings. In the drawings, the sizes of the components are conceptual, and the relative relations between the components are not limited to those shown in the drawings.

In the present disclosure, any component may contain a plurality of materials corresponding to the component. In the present disclosure, when reference is made to the amount of a component in a composition, if the composition contains a plurality of materials corresponding to the component, the amount means the total amount of the plurality of materials in the composition, unless otherwise specified.

In the present disclosure, particles corresponding to a certain component may include a plurality of types of particles. When a plurality of types of particles corresponding to a certain component are present in a composition, the particle diameter of the component is the value for the mixture of the plurality of types of particles present in the composition, unless otherwise specified.

In the present disclosure, the notation "(meth)acrylic" is meant to include at least one of "acrylic" and "methacrylic," and the notation "(meth)acrylate" is meant to include at least one of "acrylate" and "methacrylate."

In the present disclosure, a "toner for electrostatic image development" may be referred to as a "toner," and a "carrier for electrostatic image development" may be referred to as a "carrier." An "electrostatic image developer" may be referred to as a "developer."

[Carrier for electrostatic image development]

A carrier for electrostatic image development according to the present exemplary embodiment includes: a core material; and a resin coating layer that covers the core material and contains a resin and carbon black particles. The resin coating layer has an average thickness denoted as B μm and contains aggregates of the carbon black particles, the aggregates having equivalent circle diameters denoted as A μm and satisfying formula (1) below. In a cross section of the resin coating layer, the ratio of the total area of the aggregates satisfying formula (1) below to the total area of the resin coating layer is 10% or more and 50% or less.

$$0.2 \times B \leq A \leq 0.8 \times B. \qquad \text{Formula (1)}$$

Hereinafter, the aggregates satisfying formula (1) are referred to also as "specific aggregates," and the ratio of the total area of the specific aggregates to the total area of the resin coating layer in a cross section of the resin coating layer is referred to also as the "specific aggregate ratio."

In the present exemplary embodiment, the resin coating layer contains the specific aggregates, and the specific aggregate ratio is within the above range. This allows an improvement in fine line reproducibility in an image that is formed using an image forming apparatus when the apparatus is operated after standing at high temperature and high humidity for a long time and a reduction in the occurrence of color fading at edges of high-density images continuously formed at low temperature and low humidity to be achieved simultaneously. The reason for this is unclear but may be as follows.

In the carrier including the core material having the surface covered with the resin coating layer, the carbon black particles are added to the resin coating layer for the purpose of adjusting the electrical conductivity of the carrier.

However, the resistance of the carrier including the resin coating layer with the carbon black particles added thereto may change largely depending on the external environment. Specifically, when the image forming apparatus is left to stand at high temperature and high humidity (e.g., in an environment at a temperature of 30° C. and a relative humidity of 88%) for a long time (e.g., 12 hours) and is then operated to form an image including fine lines, the fine lines may be thickened, crushed together, or blurred, and the fine line reproducibility in the image becomes low. The reason for this may be as follows. Secondary aggregation of the aggregates of the carbon black particles in the resin coating layer may occur, and this results in the formation of larger agglomerate structures. In this case, conduction paths are formed between the core material and the surface of the carrier, and the resistance of the carrier decreases as the time of standing at high temperature and high humidity increases. When the image forming apparatus is operated after the resistance of the carrier has decreased due to standing, the resistance of the carrier further decreases. Since the resistance of the carrier is excessively low, the fine line reproducibility may deteriorate.

If the amount of the carbon black particles is reduced in order to prevent the formation of large agglomerate structures, the resistance of the carrier becomes excessively high in some cases. When low-area coverage images are continuously printed using the carrier with the increased resistance at low temperature and low humidity (e.g., in an environment at a temperature of 10° C. and a relative humidity of 15%) and then images including half-tone and solid images are continuously printed, color fading may occur at edges of the images. The phenomenon in which color fading occurs at edges of images continuously formed at low temperature and low humidity is referred to also as "starvation."

However, in the present exemplary embodiment, the resin coating layer contains the specific aggregates, and the specific aggregate ratio is within the above range. Specifically, the resin coating layer has a sea-island structure in which not the large agglomerate structures, but the specific aggregates having equivalent circle diameters equal to or more than 0.2 times and equal to or less than 0.8 times the average thickness of the resin coating layer are properly dispersed in the resin coating layer. Therefore, the reduction in the resistance of the carrier caused when the image forming apparatus is left to stand at high temperature and high humidity for a long is unlikely to occur, and the fine line reproducibility in images formed using the image forming apparatus operated after standing for a long time may be improved. Moreover, since the resin coating layer has the sea-island structure in which the specific aggregates are properly dispersed in the resin coating layer, the carrier has an appropriate resistance value, and therefore the occurrence of color fading, which occurs when the resistance of the carrier is excessively high, may be reduced.

It is inferred that, for the reason described above, the improvement in the fine line reproducibility in an image that is formed using the image forming apparatus when the apparatus is operated after standing at high temperature and high humidity for a long time and the reduction in the occurrence of color fading at edges of high-density images continuously formed at low temperature and low humidity can be achieved simultaneously.

The following method is used to check the presence of the specific aggregates and to compute the specific aggregate ratio.

The carrier is embedded in an embedding agent such as an epoxy resin to obtain an embedded product, and the surface of the embedded product is cut using, for example, a diamond knife. The cutting process is continued until a sufficient number of cross sections of the core material appear, and a measurement sample is thereby obtained. Then an image of the cross section of the measurement sample is taken. The image of the cross section may be taken using a conventionally known method such as a scanning electron microscope (SEM).

Next, conventionally known image analysis software (e.g., WinRoof (MITANI CORPORATION)) is used to analyze the cross sections of 100 carrier particles.

The average thickness of the resin coating layer is determined by measuring the thickness of the resin coating layer at 9 points in each of the cross sections of the 100 carrier particles and averaging the measured thickness values.

The cross section of the resin coating layer in each carrier particle is subjected to elementary analysis by energy dispersive X-ray spectroscopy (EDX) to map regions in which carbon is present.

Specifically, the mapped image is subjected to binarizing processing to identify high-intensity highly-colored regions as the regions in which carbon is present.

In the resin coating layer, carbon black is present basically as aggregates, and the equivalent circle diameter determined for each aggregate is used as the equivalent circle diameter of the aggregate. Then whether or not each aggregate corresponds to a specific aggregate is determined. The presence of the specific aggregates is thereby checked, and the specific aggregate ratio is computed.

The presence of the sea-island structure in which the specific aggregates are dispersed in the resin coating layer and the presence of the agglomerate structures are checked using the same method as that for the specific aggregates.

The specific aggregate ratio is 10% or more and 50% or less, preferably 15% or more and 45% or less, and more preferably 20% or more and 40% or less.

Examples of a mode in which the specific aggregate ratio is less than 10% include the following modes [1] to [3].

Mode [1]: The aggregates of the carbon black particles undergo secondary aggregation to form larger agglomerate structures. In this case, the number of island-shaped specific aggregates having an equivalent circle diameter equal to or less than 0.8 times the average thickness of the resin coating layer is small, and therefore the specific aggregate ratio is less than 10%.

Mode [2]: The carbon black particles are dispersed to an excessive extent, and the number of island-shaped specific aggregates having an equivalent circle diameter equal to or larger than 0.2 times the average thickness of the resin coating layer is small, and therefore the specific aggregate ratio is less than 10%.

Mode [3]: The content of the carbon black particles in the resin coating layer is small, and therefore the specific aggregate ratio is less than 10%.

In the present exemplary embodiment, the specific aggregate ratio is equal to or more than the above lower limit. Therefore, the reduction in the resistance of the carrier after standing at high temperature and high humidity for a long time is smaller than that in mode [1], and the fine line reproducibility is improved. Moreover, the occurrence of color fading, which occurs when the resistance of the carrier is excessively high, is further reduced as compared to that in modes [2] and [3].

In the present exemplary embodiment, the specific aggregate ratio is equal to or less than the above upper limit. Therefore, the reduction in the resistance of the carrier after standing at high temperature and high humidity for a long time is unlikely to occur, and the fine line reproducibility is improved.

In the present exemplary embodiment, from the viewpoint of achieving the improvement in the fine line reproducibility and the reduction in the occurrence of color fading simultaneously, it is preferable that the resin coating layer contains aggregates satisfying formula (2) below, and it is more preferable that the ratio of the total area of the aggregates satisfying formula (2) below to the total area of the resin coating layer in a cross section of the resin coating layer is 5% or more and 40% or less. The ratio is still more preferably 10% or more and 35% or less and particularly preferably 15% or more and 30% or less $$0.3\times B\leq A\leq 0.7\times B \qquad \text{Formula (2)}$$

In the present exemplary embodiment, the number of cross sections of the specific aggregates present in a 2 μm×2 μm square in the cross section of the resin coating layer is preferably 2 or more and 10 or less, more preferably 3 or more and 9 or less, and still more preferably 4 or more and 8 or less.

When the number of cross sections of the specific aggregates is equal to or more than the above lower limit, the occurrence of color fading, which occurs when the resistance of the carrier is excessively high, is reduced. When the number of cross sections of the specific aggregates is equal to or less than the above upper limit, no conductive paths are formed between the surface of the carrier and the low-resistance core material, and this prevents easy charge transfer. Therefore, the reduction in resistance of the carrier after standing at high temperature and high humidity for a long time is unlikely to occur, and the fine line reproducibility is improved.

The number of specific aggregates partially present in the 2 μm×2 μm square is represented as the ratio of their area in the square to the total area of the cross sections of the specific aggregates. For example, when one half of the area of the cross section of a specific aggregate is present in the square, its number is defined as 0.5.

No particular limitation is imposed on the method for controlling the equivalent circle diameters of the specific aggregates and the specific aggregate ratio. Examples of the method include a method in which the conditions for forming the resin coating layer are controlled and a method in which inorganic particles other than the carbon black particles are added to the resin coating layer and the conditions for forming the resin coating layer are controlled. The inorganic particles other than the carbon black particles are also referred to simply as "inorganic particles."

For example, when the resin coating layer is formed by a wet production method, a resin solution prepared by dissolving or dispersing the resin, the carbon black particles, the inorganic particles, and other optional components in a solvent is used, and the conditions when the core material and the resin solution are mixed and the conditions when the solvent is removed by drying are adjusted to control the equivalent circle diameters of the specific aggregates and the specific aggregate ratio. Examples of the conditions for mixing and the conditions for drying include temperature, pressure, and time. The conditions for mixing are, for example, a temperature of 65° C. or higher and 90° C. or lower and a time of 70 minutes or longer and 150 minutes or shorter. The conditions when the solvent is removed from the solution mixture by drying are, for example, a temperature of 75° C. or higher and 100° C. or lower and a pressure (gage pressure) of −99 kPa or higher and −80 kPa or lower.

The reason that the equivalent circle diameters of the specific aggregates and the specific aggregate ratio can be controlled by using the resin solution containing the inorganic particles and adjusting the conditions for mixing and drying is unclear. However, one possible reason is as follows. The agglomerate structures of the carbon black particles are properly crushed by the inorganic particles having a larger specific gravity and become specific aggregates, and the inorganic particles enter the spaces between the specific aggregates. In this case, the solvent is removed while secondary aggregation is prevented.

An example of the carrier according to the present exemplary embodiment will next be described in detail. This carrier includes a resin coating layer containing inorganic particles, and the resin coating layer is formed by a wet production method.

<Core Material>

No particular limitation is imposed on the core material so long as it has magnetism, and a well-known material used as a core material of a carrier may be used.

Examples of the core material include: particulate magnetic powders (magnetic particles); resin-impregnated magnetic particles obtained by impregnating a porous magnetic powder with a resin; and magnetic powder-dispersed resin particles obtained by dispersing a magnetic powder in a resin. One core material may be used alone, or a combination of two or more may be used.

Examples of the magnetic particles include: particles of magnetic metals such as iron, nickel, and cobalt; and magnetic oxides such as ferrite and magnetite. The magnetic particles may be magnetic oxide particles.

Examples of the resin forming the core material include polyethylene, polypropylene, polystyrene, polyvinyl acetate, polyvinyl alcohol, polyvinyl butyral, polyvinyl chloride, polyvinyl ether, polyvinyl ketone, vinyl chloride-vinyl acetate copolymers, styrene-acrylate copolymers, straight silicones having organosiloxane bonds and modified products thereof, fluorocarbon resins, polyesters, polycarbonates, phenolic resins, and epoxy resins. One of these resins may be used alone, or two or more of them may be used in combination. The resin forming the core material may contain an additive such as electrically conductive particles. Examples of the electrically conductive particles include: particles of metals such as gold, silver, and copper; and particles of carbon black, titanium oxide, zinc oxide, tin oxide, barium sulfate, aluminum borate, and potassium titanate.

The core material may be a particulate magnetic powder, i.e., magnetic particles.

The number average particle diameter of the core material is preferably 15 μm or more and 100 μm or less, more preferably 20 μm or more and 80 μm or less, and still more preferably 25 μm or more and 40 μm or less, because the adhesion between the toner and the carrier is appropriate, because the amount of the toner used for development is sufficient, and because a suitable magnetic brush is obtained, so that images with good fine line reproducibility are obtained.

The number average particle diameter of the core material is determined by the same method as that for checking the presence of the specific aggregates described above. Specifically, the number average particle diameter is determined by analyzing the cross sections of 100 carrier particles. More specifically, the equivalent circle diameter of the cross section of each core material particle is determined, and the average of the equivalent circle diameters of 100 particles is used as the number average particle diameter of the core material.

As for the magnetic force of the core material, its saturation magnetization at a magnetic field of 3,000 oersted is preferably 50 emu/g or more and more preferably 60 emu/g or more. The saturation magnetization is measured using a vibrating sample magnetometer VSMP 10-15 (manufactured by TOEI INDUSTRY Co., Ltd.). The sample for the measurement is charged into a cell with an inner diameter of 7 mm and a height of 5 mm, and the cell is placed in the magnetometer. In the measurement, a magnetic field is applied and increased to a maximum of 3,000 oersted. Then the applied magnetic field is reduced to generate a hysteresis curve on a recording sheet. The saturation magnetization, residual magnetization, and coercive force of the sample are determined from the data curve.

The volume resistance (volume resistivity) of the core material is preferably $1\times10^5$ Ω·cm or more and $1\times10^9$ Ω·cm or less and more preferably $1\times10^7$ Ω·cm or more and $1\times10^9$ Ω·cm or less.

The volume resistance (Ω·cm) of the core material is measured as follows. A measurement object is placed on a surface of a circular jig with a 20 $cm^2$ electrode plate disposed thereon so as to form a flat layer having a thickness of 1 mm to 3 mm. Another 20 $cm^2$ electrode plate is placed on the layer to sandwich it between these electrode plates. To eliminate pores in the measurement object, a load of 4 kg is applied to the upper electrode plate disposed on the layer, and then the thickness (cm) of the layer is measured. The upper and lower electrodes disposed on the layer are connected to an electrometer and a high-voltage power generator. A high voltage is applied between the electrodes such that an electric field of 103.8 V/cm is generated, and a current value (A) flowing between the electrodes is read. As for the measurement environment, the temperature is 20° C., and the humidity is 50% RH. The volume resistance (Ω·cm) of the measurement object is computed using the following formula.

$$R = E\times 20/(I - I_0)/L$$

In the above formula, R is the volume resistance (Ω·cm) of the measurement object, and E is the applied voltage (V). I is the current value (A), and $I_0$ is the current value (A) when the applied voltage is 0 V. L is the thickness (cm) of the layer. The coefficient 20 represents the area ($cm^2$) of the electrode plates.

<Resin Coating Layer>

The resin coating layer covers the surface of the core material. It is only necessary that the resin coating layer cover at least part of the surface of the core material. The resin coating layer may cover only part of the surface of the core material, and part of the surface of the core material may be exposed. The resin coating layer may cover the entire surface of the core material.

The resin coating layer contains at least the resin and the carbon black particles and may further contain the inorganic particles. The resin coating layer may further contain an additional component other than the resin, the carbon black particles, and the inorganic particles.

The resin, the carbon black particles, the inorganic particles, and the additional component contained in the resin coating layer will be described.

(Resin)

Examples of the resin contained in the resin coating layer include: styrene-acrylic acid copolymers; polyolefin-based resins such as polyethylene and polypropylene; polyvinyl-based and polyvinylidene-based resins such as polystyrene, (meth)acrylic resins, polyacrylonitrile, polyvinyl acetate, polyvinyl alcohol, polyvinyl butyral, polyvinyl chloride, polyvinylcarbazole, polyvinyl ether, and polyvinyl ketone; vinyl chloride-vinyl acetate copolymers; straight silicone resins having organosiloxane bonds and modified products thereof; fluorocarbon resins such as polytetrafluoroethylene, polyvinyl fluoride, polyvinylidene fluoride, and polychlorotrifluoroethylene; polyesters; polyurethanes; polycarbonates; amino resins such as urea-formaldehyde resins; and epoxy resins.

In particular, the resin contained in the resin coating layer includes preferably a (meth)acrylic resin because, since its affinity for the inorganic particles is high, the dispersibility of the fine inorganic particles is improved and the excessive formation of agglomerate structures due to the improvement in the dispersibility of carbon black is prevented. It is more preferable that the (meth)acrylic resin is contained in an amount of 50% by mass or more with respect to the total mass of the resins in the resin coating layer, and it is particularly preferable that the (meth)acrylic resin is contained in an amount of 80% by mass or more with respect to the total mass of the resins in the resin coating layer.

It is preferable that the resin contained in the resin coating layer includes a (meth)acrylic resin having an alicyclic structure because, since its affinity for the inorganic particles is high, the dispersibility of the inorganic particles is improved and the excessive formation of agglomerate structures due to the improvement in the dispersibility of carbon black is prevented. The (meth)acrylic resin having an alicyclic structure contains polymerizable components including at least a polymerizable component having an alicyclic structure. Among the polymerizable components of the (meth)acrylic resin having an alicyclic structure, the polymerizable component having an alicyclic structure is, for example, an alicyclic alkyl ester of (meth)acrylic acid (for example, an ester of (meth)acrylic acid and an alcohol having an alicyclic structure having 3 to 9 carbon atoms), and specific examples include cyclohexyl (meth)acrylate.

The (meth)acrylic resin having an alicyclic structure may be a copolymer of a polymerizable component having an alicyclic structure and a polymerizable component having no alicyclic structure. The polymerizable component having no alicyclic structure may be a lower alkyl ester of (meth) acrylic acid (e.g., a (meth)acrylic acid alkyl ester including an alkyl group having 1 to 9 carbon atoms), and specific examples include methyl (meth)acrylate, ethyl (meth)acrylate, propyl (meth)acrylate, butyl (meth)acrylate, hexyl (meth)acrylate, and 2-ethylhexyl (meth)acrylate. One of these monomers may be used, or a combination of two or more may be used.

The (meth)acrylic resin having an alicyclic structure may contain cyclohexyl (meth)acrylate as a polymerizable component. The content of the monomer unit derived from cyclohexyl (meth)acrylate contained in the (meth)acrylic resin having an alicyclic structure with respect to the total mass of the (meth)acrylic resin having an alicyclic structure is preferably 75% by mass or more and 100% by mass or less, more preferably 85% by mass or more and 100% by mass or less, and still more preferably 95% by mass or more and 100% by mass or less.

The resin contained in the resin coating layer may be a resin containing a nitrogen atom because, since its affinity for the inorganic particles is high, the dispersibility of the inorganic particles is improved and the excessive formation of agglomerate structures due to the improvement in the dispersibility of carbon black is prevented.

Examples of the resin containing a nitrogen atom include: (meth)acrylic resins having a nitrogen atom and obtained by polymerization of monomers including dimethylaminocthyl (meth)acrylate, dimethylacrylamide, acrylonitrile, etc.; amino resins such as urea, melamine, guanamine, and aniline resins; amide resins; urethane resins; and copolymers of these resins. In particular, the resin containing a nitrogen atom is preferably a (meth)acrylic resin having a nitrogen atom because, since its affinity for the inorganic particles is high, the dispersibility of the inorganic particles is improved and the excessive formation of agglomerate structures due to the improvement in the dispersibility of carbon black is prevented. A (meth)acrylic resin having an amino group is more preferred, and a polymer including dimethylaminocthyl (meth)acrylate as a polymerizable component is still more preferred.

When the resins contained in the resin coating layer include the resin having a nitrogen atom, the resin coating layer may further contain a resin having no nitrogen atom, from the viewpoint of reducing the difference in image density in different environments.

Examples of the resin having no nitrogen atom include those having no nitrogen atom in the specific examples of the resin described above. The resin having no nitrogen atom is preferably a (meth)acrylic resin having no nitrogen atom, more preferably a (meth)acrylic resin having no nitrogen atom and having an alicyclic structure, and still more preferably a polymer including cyclohexyl (meth)acrylate as a polymerizable component.

When the resin coating layer contains both the resin having a nitrogen atom and the resin having no nitrogen atom, the content of the resin having a nitrogen atom with respect to the total mass of the resins in the resin coating layer is preferably 0.2% by mass or more and 5.0% by mass or less and more preferably 0.3% by mass or more and 3.0% by mass or less.

The weight average molecular weight of each resin contained in the resin coating layer is preferably less than 300,000, more preferably less than 250,000, still more preferably 5,000 or more and less than 250,000, and particularly preferably 10,000 or more and 200,000 or less because the adhesion to the magnetic particles for obtaining the target resistance value can be easily obtained.

The weight average molecular weight is measured by gel permeation chromatography (GPC). The molecular weight measurement by GPC is performed using a measurement apparatus GPC. HLC-8120 manufactured by TOSOH Corporation. A column TSKgel Super HM-M (15 cm) manufactured by TOSOH Corporation is used, and THF is used as a solvent. The weight average molecular weight is computed from the measurement results using a molecular weight calibration curve prepared using monodispersed polystyrene standard samples.

(Carbon Black Particles)

Examples of the carbon black particles include furnace black particles, thermal black particles, channel black particles, Ketjen black particles, acetylene black particles, and color black particles. Only one type of carbon black particles may be used, or a combination of two or more types may be used.

The DBP oil absorption of the carbon black particles is, for example, 100 mL/100 g or more and 400 mL/100 g or less, preferable 120 mL/100 g or more and 300 mL/100 g or less, and more preferably 140 mL/100 g or more and 200 mL/100 g or less.

When the DBP oil absorption of the carbon black particles is within the above range, the carbon black particles are appropriately dispersed in the resin coating layer, and the carrier has an appropriate resistance value. Therefore, the reduction in the fine line reproducibility caused by the formation of large agglomerate structures by secondary aggregation is prevented, and the occurrence of color fading, which occurs when the resistance of the carrier is excessively high, is also reduced.

The DBP oil absorption is the amount of dibutyl phthalate (DBP) absorbed by 100 g of carbon black particles and defined in ASTM (American Society for Testing and Materials) D2414-6TT.

When two or more types of carbon black particles are used in combination, the DBP oil absorption of the carbon black particles is the weighted average of the DBP oil absorptions weighted by the contents of the carbon black particles.

No particular limitation is imposed on the pH of the carbon black particles. The pH is, for example, 2 or more and 10 or less and preferably 5 or more and 9 or less.

The pH of the carbon black particles is the pH of an aqueous solution prepared by adding 50 g of the carbon black particles to 1000 mL of water at 20° C. and is a value measured by a pH measurement method defined in JIS Z8802 (2011).

When two or more types of carbon black particles are used in combination, the pH is the weighted average weighted by the contents of the carbon black particles.

The number average primary particle diameter of the carbon black particles is preferably 10 nm or more and 100 nm or less, more preferably 12 nm or more and 80 nm or less, and still more preferably 15 nm or more and 60 nm or less. When the number average primary particle diameter of the carbon black particles is equal to or less than the above upper limit, the reduction in the fine line reproducibility due to the formation of conductive paths between the core material and the surface of the carrier is prevented. When the number average primary particle diameter of the carbon black particles is equal to or more than the above lower limit, the occurrence of color fading, which occurs when the resistance of the carrier is excessively high, may also be reduced.

The number average primary particle diameter of the carbon black particles is determined using a transmission electron microscope. Specifically, a carbon black specimen is dispersed in chloroform using an ultrasonic disperser at 150 kHz and 0.4 KW to produce a dispersion specimen, and the specimen is sprinkled on a carbon-reinforced support membrane to fix the specimen to the membrane. An image of the specimen is taken under the transmission electron microscope, and diameters of randomly selected 1000 or more carbon black particles in an image enlarged by a factor of 50000 to 200000 are measured using an Endter analyzer. The number average of the equivalent circle diameters of the primary particles is used as the number average primary particle diameter of the carbon black particles.

The number average equivalent circle diameter of the aggregates of the carbon black particles is, for example, 100 nm or more and 900 nm or less. From the viewpoint of improving the fine line reproducibility and reducing the occurrence of color fading simultaneously, the number average equivalent circle diameter is preferably 200 nm or more and 800 nm or less and more preferably 300 nm or more and 700 nm or less.

The number average equivalent circle diameter of the aggregates of the carbon black particles is determined by observing cross sections of the carrier and analyzing the cross sections in the same manner as that for the method for checking the presence of the specific aggregates described above. Specifically, the number average of the equivalent circle diameters of the aggregates of the carbon black particles present in the observation area is used as the number average equivalent circle diameter of the aggregates of the carbon black particles.

The BET specific surface area of the carbon black particles is preferably 50 $m^2/g$ or more and 500 $m^2/g$ or less, more preferably 100 $m^2/g$ or more and 400 $m^2/g$ or less, and still more preferably 150 $m^2/g$ or more and 400 $m^2/g$ or less. When the specific surface area of the carbon black particles is equal to or more than the above lower limit, the reduction in the fine line reproducibility due to the formation of conductive paths between the core material and the surface of the carrier is prevented. When the specific surface area of the carbon black particles is equal to or less than the above upper limit, the occurrence of color fading, which occurs when the resistance of the carrier is excessively high, may also be reduced.

The BET specific surface area is a value measured by a nitrogen substitution method using a flow-type specific surface area automatic measurement apparatus (FLOWSORB II 2300 manufactured by Shimadzu Corporation).

The content of the carbon black particles contained in the resin coating layer with respect to the total mass of the resin coating layer is preferably 0.5% by mass or more and 15% by mass or less, more preferably 1% by mass or more and 12% by mass or less, and still more preferably 2% by mass or more and 10% by mass or less.

When the content of the carbon black particles is equal to or less than the above upper limit, the reduction in the fine line reproducibility due to the formation of conductive paths between the core material and the surface of the carrier is prevented. When the content of the carbon black particles is equal to or more than the above lower limit, the occurrence of color fading, which occurs when the resistance of the carrier is excessively high, may also be reduced.

(Inorganic Particles)

Examples of the inorganic particles include: particles of metal oxides such as silica, alumina, titanium oxide (titania), barium titanate, magnesium titanate, calcium titanate, strontium titanate, iron oxide, copper oxide, zinc oxide, tin oxide, chromium oxide, cerium oxide, antimony trioxide, magnesium oxide, zirconium oxide, barium sulfate, barium carbonate, and calcium carbonate; particles of metallic compounds such as barium sulfate, aluminum borate, and potassium titanate; and particles of metals such as gold, silver, and copper. The inorganic particles may include only one type of inorganic particles or may include two or more types of inorganic particles.

The inorganic particles may include silica particles from the viewpoint that the inorganic particles have smaller diameters and a larger specific gravity than the carbon black particles.

The surfaces of the inorganic particles may be subjected to hydrophobic treatment. Examples of the hydrophobic treatment agent used when the inorganic particles include silica include well-known organosilicon compounds having alkyl groups (a methyl group, an ethyl group, a propyl group, a butyl group, etc.). Specific examples include alkoxysilane compounds, siloxane compounds, and silazane compounds. In particular, the hydrophobic treatment agent is preferably a silazane compound and preferably hexamethyldisilazane. One hydrophobic treatment agent may be used alone, or a combination of two or more may be used.

By subjecting the surfaces of the inorganic particles to hydrophobic treatment, the uniform dispersibility of the inorganic particles in the resin composition is improved, and the dispersibility of the carbon black may be improved.

Examples of the hydrophobic treatment of the inorganic particles with the hydrophobic treatment agent include: a method in which supercritical carbon dioxide is used to dissolve the hydrophobic treatment agent in the supercritical carbon dioxide and the hydrophobic treatment agent is caused to adhere to the surfaces of the inorganic particles; a method in which a solution containing the hydrophobic treatment agent and a solvent capable of dissolving the hydrophobic treatment agent is imparted (sprayed or applied) to the surfaces of the inorganic particles in air to cause the hydrophobic treatment agent to adhere to the surfaces of the inorganic particles; and a method in which a solution containing the hydrophobic treatment agent and a solvent capable of dissolving the hydrophobic treatment agent is added to a dispersion of the inorganic particles in air and then the mixture of the inorganic particle dispersion and the solution is held and dried.

From the viewpoint of achieving the improvement in the fine line reproducibility and the reduction in the occurrence of color fading simultaneously, the number average primary particle diameter of the inorganic particles is preferably more than 1 nm and 80 nm or less, more preferably 2 nm or more and 60 nm or less, and still more preferably 5 nm or more and 50 nm or less.

The number average primary particle diameter of the inorganic particles may be smaller than the number average primary particle diameter of the carbon black particles. When the number average primary particle diameter of the inorganic particles is smaller than the number average primary particle diameter of the carbon black particles, agglomerate structures of the carbon black particles are properly crushed, and the specific aggregate ratio can be easily controlled to an appropriate value. Therefore, the improvement in the fine line reproducibility and the reduction in the occurrence of color fading can be achieved simultaneously.

From the viewpoint of achieving the improvement in the fine line reproducibility and the reduction in the occurrence of color fading simultaneously, the number average primary particle diameter of the inorganic particles is preferably equal to or more than 0.01 times and equal to or less than 8 times the number average primary particle diameter of the carbon black particles, more preferably equal to or more than 0.1 times and equal to or less than 2 times, and still more preferably equal to or more than 0.2 times and equal to or less than 0.8 times.

The number average primary particle diameter of the inorganic particles is determined by observing the cross sections of the carrier and analyzing the cross sections in the same manner as that for the method for checking the presence of the specific aggregates described above. Specifically, the number average of the equivalent circle diameters of 50 primary particles of the inorganic particles contained in the resin coating layer is used as the number average primary particle diameter of the inorganic particles.

From the viewpoint of achieving the improvement in the fine line reproducibility and the reduction in the occurrence of color fading simultaneously, the specific gravity of the inorganic particles is preferably 2 or more and 8 or less, more preferably 2 or more and 5 or less, and still more preferably 2 or more and 3 or less.

From the viewpoint of achieving the improvement in the fine line reproducibility and the reduction in the occurrence of color fading simultaneously, the specific gravity of the inorganic particles is preferably equal to or more than 1 time and equal to or less than 5 times the specific gravity of the carbon black particles, more preferably equal to or more than 1 time and equal to or less than 2 times, and still more preferably equal to or more than 1 time and equal to or less than 1.5 times.

The specific gravity is measured using a Le Chatelier specific gravity bottle according to 5-2-1 in JIS K 0061 as follows.

(1) The Le Chatelier specific gravity bottle is charged with 250 mL of ethyl alcohol such that the meniscus is positioned at a scale mark.
(2) The specific gravity bottle is immersed in a constant-temperature water tank, and the position of the meniscus when the liquid temperature reaches 20.0° C.±0.2° C. is accurately read on the scale of the specific gravity bottle (accuracy: 0.0025 mL).
(3) 100 g of a sample is weighed.
(4) The weight sample is placed in the specific gravity bottle, and bubbles are removed.
(5) The specific gravity bottle is immersed in the constant-temperature water tank, and the position of the meniscus when the liquid temperature reaches 20.0° C.±0.2° C. is accurately read on the scale of the specific gravity bottle (accuracy: 0.0025 mL).
(6) The specific gravity is computed using the following formulas.

$$D=W/(L2-L1) \quad \text{Formula:}$$

$$S=D/0.9982 \quad \text{Formula:}$$

In these formulas, D is the density of the sample (g/cm$^3$, 20° C.), and S is the specific gravity of the sample (20° C.). W is the apparent mass (g) of the sample. L1 is the reading of the meniscus (mL, 20° C.) before the sample is placed in the specific gravity bottle, and L2 is the reading of the meniscus (mL, 20° C.) after the sample is placed in the specific gravity bottle. 0.9982 is the density (g/cm$^3$) of water at 20° C.

From the viewpoint of achieving the improvement in the fine line reproducibility and the reduction in the occurrence of color fading simultaneously, the content of the inorganic particles contained in the resin coating layer with respect to the total mass of the resin coating layer is preferably 10% by mass or more and 60% by mass or less, more preferably 15% by mass or more and 50% by mass or less, and still more preferably 20% by mass or more and 40% by mass or less.

From the viewpoint of achieving the improvement in the fine line reproducibility and the reduction in the occurrence of color fading simultaneously, the content of the inorganic particles contained in the resin coating layer is preferably equal to or more than 0.01 times and equal to or less than 3 times the content of the carbon black particles, more preferably equal to or more than 0.1 times and equal to or less than 2 times, and still more preferably equal to or more than 0.1 times and equal to or less than 0.5 times.

(Additional Component)

The resin coating layer may contain an optional additional component as needed.

Examples of the additional component include nitrogen-containing resin particles.

The nitrogen-containing resin particles contained in the resin coating layer have an advantage in that electrification can be controlled.

Examples of the nitrogen-containing resin particles include: particles of (meth)acrylic-based resins obtained by polymerizing; monomers including dimethylaminoethyl (meth)acrylate, dimethylacrylamide, and acrylonitrile; particles of amino resins such as urea, melamine, guanamine, and aniline resins; particles of amide resins; particles of urethane resins; and particles of copolymers of above resins. When the resin coating layer contains the nitrogen-containing resin particles, the content of the nitrogen-containing resin particles with respect to the total mass of the resin coating layer is preferably 5% by mass or more and 20% by mass or less from the viewpoint of controlling electrification, more preferably 8% by mass or more and 16% by mass or less, and still more preferably 9.5% by mass or more and 14% by mass or less.

(Characteristics and Formation of Resin Coating Layer)

From the viewpoint of the resistance and electrification performance, the average thickness of the resin coating layer is preferably 0.6 μm or more and 1.4 μm or less, more preferably 0.8 μm or more and 1.2 μm or less, and still more preferably 0.8 μm or more and 1.1 μm or less.

When the average thickness of the resin coating layer is equal to or more than the above lower limit, the reduction in the fine line reproducibility due to the formation of conductive paths between the core material and the surface of the carrier is prevented. When the average thickness of the resin coating layer is equal to or less than the above upper limit, the occurrence of color fading, which occurs when the resistance of the carrier is excessively high, may also be reduced.

Examples of the method for forming the resin coating layer on the surface of the core material include a wet production method and a dry production method. The wet production method uses a solvent that can dissolve or disperse the resin forming the coating resin layer. The dry production method does not use the solvent.

Examples of the wet production method include: an immersion method in which the core material is immersed in a resin solution for forming the resin coating layer to thereby coat the core material with the resin; a spray method in which the resin solution for forming the resin coating layer is sprayed onto the surface of the core material; a fluidized bed method in which the resin solution for forming the resin coating layer is sprayed onto the core material floating in a fluidized bed; and a kneader-coater method in which the core material and the resin solution for forming the resin coating layer are mixed in a kneader coater and then the solvent is removed. Any of these production methods may be repeatedly performed, or a combination of these methods may be used.

The resin solution for forming the resin coating layer used in the wet production method is prepared by dissolving or dispersing the resin, the carbon black particles, the inorganic particles, and an additional component in the solvent. No particular limitation is imposed on the solvent. Examples of the solvent include: aromatic hydrocarbons such as toluene and xylene; ketones such as acetone and methyl ethyl ketone; and ethers such as tetrahydrofuran and dioxane.

Examples of the dry production method include a method in which a dry mixture of the core material and the resin for forming the resin coating layer is heated to form the resin coating layer. Specifically, for example, the core material and the resin for forming the resin coating layer are mixed in air and heat-fused to form the resin coating layer.

In the present exemplary embodiment, the wet production method may be used to form the resin coating layer in order that the equivalent circle diameters of the specific aggregates and the specific aggregate ratio can be easily controlled, as described above.

As for the conditions for mixing the core material and the resin solution, for example, the temperature is 65° C. or higher and 90° C. or lower (preferably 70° C. or higher and 80° C. or lower), and the pressure (gauge pressure) is −30 kPa or higher and −10 kPa or lower (preferably −25 kPa or higher and −15 kPa or lower). The time is 70 minutes or longer and 150 minutes or shorter (preferably 100 minutes or longer and 140 minutes or shorter).

The conditions for drying when the solvent is removed from the solution mixture of the core material and the resin solution are a temperature of 75° C. or higher and 100° C. or lower (preferably 80° C. or higher and 95° C. or lower), a pressure (gauge pressure) of −99 kPa or higher and −80 kPa or lower (preferably −95 kPa or higher and −85 kPa or lower), etc.

The area fraction of the core material exposed at the surface of the carrier is preferably 5% or more and 30% or less, more preferably 7% or more and 25% or less, and still more preferably 10% or more and 25% or less. The area fraction of the core material exposed at the surface of the carrier can be controlled by changing the amount of the resin used to form the resin coating layer. The larger the amount of the resin with respect to the amount of the core material, the smaller the area fraction of the exposed core material.

When the core material is magnetic particles, the area fraction of the core material exposed at the surface of the carrier is a value determined by the following method.

The carrier used as a target and the magnetic particles obtained by removing the resin coating layer from the target carrier are prepared. Examples of the method for removing the resin coating layer from the carrier include a method in which an organic solvent is used to dissolve the resin component to thereby remove the resin coating layer and a method in which the carrier is heated to about 800° C. so that the resin component vanishes to thereby remove the resin coating layer. The carrier and the magnetic particles are used as measurement specimens. The Fe concentration (atomic %) on the surface of each measurement specimen is quantified by XPS. A value represented by (the Fe concentration in the carrier)/(the Fe concentration in the magnetic particles)×100 is computed and used as the area fraction (%) of the exposed magnetic particles.

From the viewpoint of reducing the density unevenness in images, the surface roughness Ra of the carrier is preferably more than 0.1 μm and less than 1.0 μm, more preferably 0.11 μm or more and less than 0.85 μm, and still more preferably 0.12 μm or more and 0.8 μm or less.

No particular limitation is imposed on the method for controlling the surface roughness Ra of the carrier. Examples of the method include: a method in which the surface roughness Ra of the core material is adjusted; a method in which the average thickness of the resin coating layer is adjusted; and a method in which, when the resin forming the resin coating layer, the core material, the carbon black particles, the inorganic particles, and the optionally added solvent are mixed and stirred to produce the carrier, the stirring speed, the stirring temperature, and the stirring time are adjusted.

The surface roughness Ra of the carrier is measured by the following method. In the method for measuring the Ra (arithmetic mean roughness) of the surface of the carrier, 2000 carrier particles and an ultra-depth color 3D profile measuring microscope (VK9700 manufactured by KEYENCE CORPORATION) are used, and the surfaces of the carrier particles are observed at a magnification of 1000× according to JIS B0601 (1994 edition). Specifically, the Ra of the carrier surface is determined as follows. A roughness curve is determined from a three-dimensional profile of the carrier surface observed under the microscope, and the absolute values of deviations of the measurement values from the average value in the roughness curve are summed and averaged. The sampling length when the Ra of the carrier surface is determined is 10 μm, and the cutoff value is 0.08 mm.

The number average particle diameter of the carrier is preferably 15 μm or more and 100 μm or less, more preferably 20 μm or more and 80 μm or less, and particularly preferably 25 μm or more and 40 μm or less, because the adhesion between the toner and the carrier is appropriate, because the amount of the toner used for development is sufficient, and because a suitable magnetic brush is obtained, so that images with good fine line reproducibility are obtained. The number average particle diameter of the carrier is determined by the same method as the method for determining the number average particle diameter of the core material.

[Electrostatic Image Developer]

A developer according to the present exemplary embodiment is a two-component developer containing the carrier for electrostatic image development according to the present exemplary embodiment and a toner. The toner contains toner particles and optional external additives.

The mixing ratio (mass ratio) of the carrier and the toner in the developer is preferably the carrier: the toner=100:1 to 100:30 and more preferably 100:3 to 100:20.

<Toner Particles>

The toner particles include, for example, a binder resin and optionally include a coloring agent, a release agent, and additional additives.

—Binder Resin—

Examples of the binder resin include: vinyl-based resins composed of homopolymers of monomers such as styrenes (such as styrene, p-chlorostyrene, and α-methylstyrene), (meth)acrylates (such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (such as acrylonitrile and methacrylonitrile), vinyl ethers (such as vinyl methyl ether and vinyl isobutyl ether), vinyl ketones (such as vinyl methyl ketone, vinyl ethyl ketone, and vinyl isopropenyl ketone), and olefins (such as ethylene, propylene, and butadiene); and vinyl resins composed of copolymers of combinations of two or more of the above monomers.

Other examples of the binder resin include: non-vinyl-based resins such as epoxy resins, polyester resins, polyurethane resins, polyamide resins, cellulose resins, polyether resins, and modified rosins; mixtures of the non-vinyl-based resins and the above-described vinyl resins; and graft polymers obtained by polymerizing a vinyl-based monomer in the presence of any of these resins.

One of these binder resins may be used alone, or two or more of them may be used in combination.

The binder resin may be a polyester resin.

Examples of the polyester resin include well-known amorphous polyester resins. The polyester resin may be a combination of an amorphous polyester resin and a crystalline polyester resin. However, the content of the crystalline polyester resin with respect to the total amount of the binder resins may be within the range of 2% by mass or more and 40% by mass or less (preferably 2% by mass or more and 20% by mass or less).

The "crystalline" resin means that, in differential scanning calorimetry (DSC), a clear endothermic peak is observed instead of a stepwise change in the amount of heat absorbed. Specifically, the half width of the endothermic peak when the measurement is performed at a heating rate of 10 (° C./min) is 10° C. or less.

The "amorphous" resin means that the half width exceeds 10° C., that a stepwise change in the amount of heat absorbed is observed, or that a clear endothermic peak is not observed.

—Amorphous Polyester Resin

The amorphous polyester resin may be, for example, a polycondensation product of a polycarboxylic acid and a polyhydric alcohol. The amorphous polyester resin used may be a commercial product or a synthesized product.

Examples of the polycarboxylic acid include aliphatic dicarboxylic acids (such as oxalic acid, malonic acid, maleic acid, fumaric acid, citraconic acid, itaconic acid, glutaconic acid, succinic acid, alkenyl succinic acids, adipic acid, and sebacic acid), alicyclic dicarboxylic acids (such as cyclohexanedicarboxylic acid), aromatic dicarboxylic acids (such as terephthalic acid, isophthalic acid, phthalic acid, and naphthalenedicarboxylic acid), anhydrides thereof, and lower alkyl (e.g., having 1 to 5 carbon atoms) esters thereof. In particular, the polycarboxylic acid is, for example, preferably an aromatic dicarboxylic acid.

The polycarboxylic acid used may be a combination of a dicarboxylic acid and a tricarboxylic or higher polycarboxylic acid having a crosslinked or branched structure. Examples of the tricarboxylic or higher polycarboxylic acid include trimellitic acid, pyromellitic acid, anhydrides thereof, and lower alkyl (e.g., having 1 to 5 carbon atoms) esters thereof.

Any of these polycarboxylic acids may be used alone or in combination of two or more.

Examples of the polyhydric alcohol include aliphatic diols (such as ethylene glycol, diethylene glycol, triethylene glycol, propylene glycol, butanediol, hexanediol, and neopentyl glycol), alicyclic diols (such as cyclohexanediol, cyclohexanedimethanol, and hydrogenated bisphenol A), and aromatic diols (such as an ethylene oxide adduct of bisphenol A and a propylene oxide adduct of bisphenol A). In particular, the polyhydric alcohol is, for example, preferably an aromatic diol or an alicyclic diol and more preferably an aromatic diol.

The polyhydric alcohol used may be a combination of a diol and a trihydric or higher polyhydric alcohol having a crosslinked or branched structure. Examples of the trihydric or higher polyhydric alcohol include glycerin, trimethylolpropane, and pentaerythritol.

Any of these polyhydric alcohols may be used alone or in combination or two or more.

The glass transition temperature (Tg) of the amorphous polyester resin is preferably 50° C. or higher and 80° C. or lower and more preferably 50° C. or higher and 65° C. or lower.

The glass transition temperature is determined using a DSC curve obtained by differential scanning calorimetry (DSC). More specifically, the glass transition temperature is determined from "extrapolated glass transition onset temperature" described in a glass transition temperature determination method in "Testing methods for transition temperatures of plastics" in JIS K7121: 1987.

The weight average molecular weight (Mw) of the amorphous polyester resin is preferably 5000 or more and 1000000 or less and more preferably 7000 or more and 500000 or less.

The number average molecular weight (Mn) of the amorphous polyester resin may be 2000 or more and 100000 or less.

The molecular weight distribution Mw/Mn of the amorphous polyester resin is preferably 1.5 or more and 100 or less and more preferably 2 or more and 60 or less.

The weight average molecular weight and the number average molecular weight are measured by gel permeation chromatography (GPC). In the molecular weight distribution measurement by GPC, a GPC measurement apparatus HLC-8120GPC manufactured by TOSOH Corporation is used, and a TSKgel Super HM-M (15 cm) column manufactured by TOSOH Corporation and a THF solvent are used. The weight average molecular weight and the number average molecular weight are computed from the measurement results using a molecular weight calibration curve produced using monodispersed polystyrene standard samples.

The amorphous polyester resin can be obtained by a well-known production method. For example, in one production method, the polymerization temperature is set to 180° C. or higher and 230° C. or lower. If necessary, the pressure of the reaction system is reduced, and the reaction is allowed to proceed while water and alcohol generated during condensation are removed.

When raw material monomers are not dissolved or not compatible with each other at the reaction temperature, a high-boiling point solvent serving as a solubilizer may be added to dissolve the monomers. In this case, the polycondensation reaction is performed while the solubilizer is removed by evaporation. When a monomer with poor compatibility is present in the copolymerization reaction, the monomer with poor compatibility and an acid or an alcohol to be polycondensed with the monomer are condensed in advance and then the resulting polycondensation product and the rest of the components are subjected to polycondensation.

—Crystalline Polyester Resin

The crystalline polyester resin is, for example, a polycondensation product of a polycarboxylic acid and a polyhydric alcohol. The crystalline polyester resin used may be a commercial product or a synthesized product.

The crystalline polyester resin may be a polycondensation product prepared using a polymerizable linear aliphatic monomer rather than using a polymerizable monomer having an aromatic ring, in order to facilitate the formation of a crystalline structure.

Examples of the polycarboxylic acid include aliphatic dicarboxylic acids (such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (e.g., dibasic acids such as phthalic acid, isophthalic acid, terephthalic acid, and naphthalene-2,6-dicarboxylic acid), anhydrides thereof, and lower alkyl (e.g., having 1 to 5 carbon atoms) esters thereof.

The polycarboxylic acid used may be a combination of a dicarboxylic acid and a tricarboxylic or higher polycarboxylic acid having a crosslinked or branched structure. Examples of the tricarboxylic acid include aromatic carboxylic acids (such as 1,2,3-benzenetricarboxylic acid, 1,2,4-benzenetricarboxylic acid, and 1,2,4-naphthalene tricarboxylic acid), anhydrides thereof, and lower alkyl (e.g., having 1 to 5 carbon atoms) esters thereof.

The polycarboxylic acid used may be a combination of a dicarboxylic acid, a dicarboxylic acid having a sulfonic acid group, and a dicarboxylic acid having an ethylenic double bond.

Any of these polycarboxylic acids may be used alone or in combination of two or more.

The polyhydric alcohol may be, for example, an aliphatic diol (e.g., a linear aliphatic diol with a main chain having 7 to 20 carbon atoms). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. In particular, the aliphatic diol is preferably 1,8-octanediol, 1,9-nonanediol, or 1,10-decanediol.

The polyhydric alcohol used may be a combination of a diol and a trihydric or higher polyhydric alcohol having a crosslinked or branched structure. Examples of the trihydric or higher polyhydric alcohol include glycerin, trimethylolethane, trimethylolpropane, and pentaerythritol.

Any of these polyhydric alcohols may be used alone or in combination of two or more.

In the polyhydric alcohol, the content of the aliphatic diol may be 80% by mole or more and preferably 90% by mole or more.

The melting temperature of the crystalline polyester resin is preferably 50° C. or higher and 100° C. or lower, more preferably 55° C. or higher and 90° C. or lower, and still more preferably 60° C. or higher and 85° C. or lower.

The melting temperature is determined using a DSC curve obtained by differential scanning calorimetry (DSC) from "peak melting temperature" described in a melting temperature determination method in "Testing methods for transition temperatures of plastics" in JIS K7121: 1987.

The weight average molecular weight (Mw) of the crystalline polyester resin may be 6,000 or more and 35,000 or less.

Like the amorphous polyester, the crystalline polyester resin is obtained by a well-known production method.

The content of the binder resin with respect to the total mass of the toner particles is preferably 40% by mass or more and 95% by mass or less, more preferably 50% by mass or more and 90% by mass or less, and still more preferably 60% by mass or more and 85% by mass or less.

—Coloring Agent—

Examples of the coloring agent include: pigments such as carbon black, chrome yellow, hansa yellow, benzidine yellow, threne yellow, quinoline yellow, pigment yellow, permanent orange GTR, pyrazolone orange, vulcan orange, watchung red, permanent red, brilliant carmine 3B, brilliant carmine 6B, DuPont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate; and dyes such as acridine-based dyes, xanthene-based dyes, azo-based dyes, benzoquinone-based dyes, azine-based dyes, anthraquinone-based dyes, thioindigo-based dyes, dioxazine-based dyes, thiazine-based dyes, azomethine-based dyes, indigo-based dyes, phthalocyanine-based dyes, aniline black-based dyes, polymethine-based dyes, triphenylmethane-based dyes, diphenylmethane-based dyes, and thiazole-based dyes.

One coloring agent may be used alone, or two or more coloring agents may be used in combination.

The coloring agent used may be optionally subjected to surface treatment or may be used in combination with a dispersant. A plurality of coloring agents may be used in combination.

The content of the coloring agent with respect to the total mass of the toner particles is preferably 1% by mass or more and 30% by mass or less and more preferably 3% by mass or more and 15% by mass or less.

—Release Agent—

Examples of the release agent include: hydrocarbon-based waxes; natural waxes such as carnauba wax, rice wax, and candelilla wax; synthetic and mineral/petroleum-based waxes such as montan wax; and ester-based waxes such as fatty acid esters and montanic acid esters. However, the release agent is not limited to these waxes.

The melting temperature of the release agent is preferably 50° C. or higher and 110° C. or lower and more preferably 60° C. or higher and 100° C. or lower.

The melting temperature is determined using a DSC curve obtained by differential scanning calorimetry (DSC) from "peak melting temperature" described in a melting temperature determination method in "Testing methods for transition temperatures of plastics" in JIS K7121: 1987.

The content of the release agent with respect to the total mass of the toner particles is preferably 1% by mass or more and 20% by mass or less and more preferably 5% by mass or more and 15% by mass or less.

—Additional Additives—

Examples of the additional additives include well-known additives such as a magnetic material, a charge control agent, and an inorganic powder. These additives are contained in the toner particles as internal additives.

—Characteristics Etc. Of Toner Particles—

The toner particles may have a single layer structure or may have a so-called core-shell structure including a core (core particle) and a coating layer (shell layer) covering the core.

Toner particles having the core-shell structure may each include, for example: a core containing a binder resin and optional additives such as a coloring agent and a release agent; and a coating layer containing a binder resin.

The volume average particle diameter (D50v) of the toner particles is preferably 2 μm or more and 10 μm or less and more preferably 4 μm or more and 8 μm or less.

The volume average particle diameter (D50v) of the toner particles is measured using Coulter Multisizer II (manufactured by Beckman Coulter, Inc.), and ISOTON-II (manufactured by Beckman Coulter, Inc.) is used as an electrolyte.

In the measurement, 0.5 mg to 50 mg of a measurement sample is added to 2 mL of a 5% by mass aqueous solution of a surfactant (which may be sodium alkylbenzenesulfonate) serving as a dispersant. The mixture is added to 100 mL to 150 mL of the electrolyte.

The electrolyte with the sample suspended therein is subjected to dispersion treatment for 1 minute using an ultrasonic dispersion apparatus, and then the particle size distribution of particles having diameters within the range of 2 μm to 60 μm is measured using an aperture having an aperture diameter of 100 μm in the Coulter Multisizer II. The number of particles sampled is 50000. A volume-based particle size distribution is drawn from the small diameter side, and the particle diameter at a cumulative frequency of 50% is defined as the volume average particle diameter D50v.

The average circularity of the toner particles is preferably 0.94 or more and 1.00 or less and more preferably 0.95 or more and 0.98 or less.

The circularity of a toner particle is determined as (the peripheral length of an equivalent circle of the toner particle)/(the peripheral length of the toner particle) (i.e., the peripheral length of a circle having the same area as a projection image of the particle/the peripheral length of the projection image of the particle). Specifically, the average circularity is a value measured by the following method.

First, the toner particles used for the measurement are collected by suction, and a flattened flow of the particles is formed. Particle images are captured as still images using flashes of light, and the average circularity is determined by subjecting the particle images to image analysis using a flow-type particle image analyzer (FPIA-3000 manufactured by SYSMEX Corporation). The number of sampled particles for determination of the average circularity is 3,500.

When the toner contains an external additive, the toner (developer) for the measurement is dispersed in water containing a surfactant, and the dispersion is subjected to ultrasonic treatment. The toner particles with the external additive removed are thereby obtained.

—Method for Producing Toner Particles—

The toner particles may be produced by a dry production method (such as a kneading-grinding method) or by a wet production method (such as an aggregation/coalescence method or a dissolution/suspension method). No particular limitation is imposed on the production method, and any known production method may be used. In particular, the aggregation/coalescence method may be used to obtain the toner particles.

Specifically, when the toner particles are produced, for example, by the aggregation/coalescence method, the toner particles are produced through: the step of preparing a resin particle dispersion in which resin particles used as the binder resin are dispersed (a resin particle dispersion preparing step); the step of aggregating the resin particles (and other optional particles) in the resin particle dispersion (the dispersion may optionally contain an additional particle dispersion mixed therein) to form aggregated particles (an aggregated particle forming step); and the step of heating the aggregated particle dispersion containing the aggregated particles dispersed therein to fuse and coalesce the aggregated particles to thereby form the toner particles (a fusion/coalescence step).

These steps will next be described in detail.

In the following, a method for obtaining toner particles containing the coloring agent and the release agent will be described, but the coloring agent and the release agent are used optionally. Of course, an additional additive other than the coloring agent and the release agent may be used.

—Resin Particle Dispersion Preparing Step—

The resin particle dispersion in which the resin particles used as the binder resin are dispersed is prepared, and, for example, a coloring agent particle dispersion in which coloring agent particles are dispersed and a release agent particle dispersion in which release agent particles are dispersed are also prepared.

The resin particle dispersion is prepared, for example, by dispersing the resin particles in a dispersion medium using a surfactant.

Examples of the dispersion medium used for the resin particle dispersion include aqueous mediums.

Examples of the aqueous medium include: water such as distilled water and ion exchanged water; and alcohols. Any of these may be used alone or in combination of two or more.

Examples of the surfactant include: anionic surfactants such as sulfate-based surfactants, sulfonate-based surfactants, phosphate-based surfactants, and soap-based surfactants; cationic surfactants such as amine salt-based surfactants and quaternary ammonium salt-based surfactants; and nonionic surfactants such as polyethylene glycol-based surfactants, alkylphenol ethylene oxide adduct-based surfactants, and polyhydric alcohol-based surfactants. Of these, an anionic surfactant or a cationic surfactant may be used. A nonionic surfactant may be used in combination with the anionic surfactant or the cationic surfactant.

Any of these surfactants may be used alone or in combination of two or more.

To disperse the resin particles in the dispersion medium to form the resin particle dispersion, a commonly used dispersing method that uses, for example, a rotary shearing-type homogenizer, a ball mill using media, a sand mill, or a dyno-mill may be used. The resin particles may be dispersed in the dispersion medium by a phase inversion emulsification method, but this depends on the type of resin particles. In the phase inversion emulsification method, the resin to be dispersed is dissolved in a hydrophobic organic solvent that can dissolve the resin, and a base is added to an organic continuous phase (O phase) to neutralize it. Then the aqueous medium (W phase) is added to change the form of the resin from W/O to O/W, and the resin is thereby dispersed as particles in the aqueous medium.

The volume average diameter of the resin particles dispersed in the resin particle dispersion is, for example, preferably 0.01 μm or more and 1 μm or less, more preferably 0.08 μm or more and 0.8 μm or less, and still more preferably 0.1 μm or more and 0.6 μm or less.

The volume average particle diameter of the resin particles is measured as follows. A particle size distribution measured by a laser diffraction particle size measurement apparatus (e.g., LA-700 manufactured by HORIBA Ltd.) is used and divided into different particle diameter ranges (channels), and a cumulative volume distribution computed from the small particle diameter side is determined. The particle diameter at which the cumulative frequency is 50% is measured as the volume average particle diameter D50v. The volume average diameters of particles in other dispersions are measured in the same manner. The content of the resin particles contained in the resin particle dispersion is preferably 5% by mass or more and 50% by mass or less and more preferably 10% by mass or more and 40% by mass or less.

For example, the coloring agent particle dispersion and the release agent particle dispersion are prepared in a similar manner to the resin particle dispersion. Specifically, the descriptions of the volume average diameter of the particles in the resin particle dispersion, the dispersion medium for the resin particle dispersion, the dispersing method, and the content of the resin particles are applicable to the coloring agent particles dispersed in the coloring agent particle dispersion and the release agent particles dispersed in the release agent particle dispersion.

—Aggregated Particle Forming Step—

Next, the resin particle dispersion, the coloring agent particle dispersion, and the release agent particle dispersion are mixed.

Then the resin particles, the coloring agent particles, and the release agent particles are hetero-aggregated in the dispersion mixture to form aggregated particles containing the resin particles, the coloring agent particles, and the release agent particles and having diameters close to the diameters of target toner particles.

Specifically, for example, a flocculant is added to the dispersion mixture, and the pH of the dispersion mixture is adjusted to acidic (for example, a pH of 2 or more and 5 or less). Then a dispersion stabilizer is optionally added, and the resulting mixture is heated to a temperature close to the glass transition temperature of the resin particles (specifically, for example, a temperature equal to or higher than the glass transition temperature of the resin particles—30° C. and equal to or lower than the glass transition temperature—10° C.) to aggregate the particles dispersed in the dispersion mixture to thereby form aggregated particles.

In the aggregated particle forming step, the flocculant may be added at room temperature (e.g., 25° C.) while the dispersion mixture is agitated, for example, in a rotary shearing-type homogenizer. Then the pH of the dispersion mixture is adjusted to acidic (e.g., a pH of 2 or more and 5 or less), and the dispersion stabilizer is optionally added. Then the resulting mixture is heated.

Examples of the flocculant include a surfactant with a polarity opposite to the polarity of the surfactant contained in the dispersion mixture, inorganic metal salts, and divalent or higher polyvalent metal complexes. When a metal complex is used as the flocculant, the amount of the surfactant used can be reduced, and charging characteristics are improved.

The flocculant and an additive that forms a complex with a metal ion in the flocculant or a similar bond may be optionally used. The additive used may be a chelating agent.

Examples of the inorganic metal salts include: metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

The chelating agent used may be a water-soluble chelating agent. Examples of the chelating agent include: oxycarboxylic acids such as tartaric acid, citric acid, and gluconic acid; and amino carboxylic acids such as iminodiacetic acid (IDA), nitrilotriacetic acid (NTA), and ethylenediaminetetraacetic acid (EDTA).

The amount of the chelating agent added is preferably 0.01 parts by mass or more and 5.0 parts by mass or less and more preferably 0.1 parts by mass or more and less than 3.0 parts by mass based on 100 parts by mass of the resin particles.

—Fusion/Coalescence Step—

Next, the aggregated particle dispersion in which the aggregated particles are dispersed is heated, for example, to a temperature equal to or higher than the glass transition temperature of the resin particles (e.g., a temperature higher by 10° C. to 30° C. than the glass transition temperature of the resin particles) to fuse and coalesce the aggregated particles to thereby form toner particles.

The toner particles are obtained through the above-described steps.

Alternatively, the toner particles may be produced through: the step of, after the preparation of the aggregated particle dispersion containing the aggregated particles dispersed therein, mixing the aggregated particle dispersion further with the resin particle dispersion containing the resin particles dispersed therein and then causing the resin particles to adhere to the surface of the aggregated particles to aggregate them to thereby form second aggregated particles; and the step of heating a second aggregated particle dispersion containing the second aggregated particles dispersed therein to fuse and coalesce the second aggregated particles to thereby form toner particles having the core-shell structure.

After completion of the fusion/coalescence step, the toner particles formed in the solution are subjected to a well-known washing step, a solid-liquid separation step, and a drying step to obtain dried toner particles. From the viewpoint of chargeability, the toner particles may be subjected to displacement washing with ion exchanged water sufficiently in the washing step. From the viewpoint of productivity, suction filtration, pressure filtration, etc. may be performed in the solid-liquid separation step. From the viewpoint of productivity, freeze-drying, flash drying, fluidized drying, vibrating fluidized drying, etc. may be performed in the drying step.

The toner according to the present exemplary embodiment is produced, for example, by adding the external additives to the dried toner particles obtained and mixing them. The mixing may be performed, for example, using a V blender, a Henschel mixer, a Loedige mixer, etc. If necessary, coarse particles in the toner may be removed using a vibrating sieving machine, an air sieving machine, etc.

—External Additives—

Examples of the external additives include inorganic particles. Examples of the inorganic particles include $SiO_2$, $TiO_2$, $SrTiO_3$, $Al_2O_3$, CuO, ZnO, $SnO_2$, $CeO_2$, $Fe_2O_3$, MgO, BaO, CaO, $K_2O$, $Na_2O$, $ZrO_2$, $CaO{\cdot}SiO_2$, $K_2O{\cdot}(TiO_2)_n$, $Al_2O_3{\cdot}2SiO_2$, $CaCO_3$, $MgCO_3$, $BaSO_4$, and $MgSO_4$.

The surfaces of the inorganic particles used as an external additive may be subjected to hydrophobic treatment. For example, the hydrophobic treatment is performed by immersing the inorganic particles in a hydrophobic treatment agent. No particular limitation is imposed on the hydrophobic treatment agent. Examples thereof include silane-based coupling agents, silicone oils, titanate-based coupling agents, and aluminum-based coupling agents. These may be used alone or in combination of two or more The amount of the hydrophobic treatment agent is generally 1 part by mass or more and 10 parts by mass or less based on 100 parts by mass of the inorganic particles.

Other examples of the external additives include resin particles (particles of resins such as polystyrene, polymethyl methacrylate, and melamine resins) and cleaning activators (such as a metal salt of a higher fatty acid typified by zinc stearate and particles of a fluorine-based high-molecular weight material).

The amount of the external additives added externally with respect to the mass of the toner particles is preferably 0.01% by mass or more and 10% by mass or less and more preferably 0.01% by mass or more and 6.0% by mass or less.

[Image Forming Apparatus and Image Forming Method]

An image forming apparatus according to the present exemplary embodiment includes: an image holding member; a charging device that charges a surface of the image holding member; an electrostatic image forming device that forms an electrostatic image on the charged surface of the image holding member; a developing device that houses an electrostatic image developer and develops the electrostatic image formed on the surface of the image holding member with the electrostatic image developer to thereby form a toner image; a transferring device that transfers the toner image formed on the surface of the image holding member onto a recording medium; and a fixing device that fixes the toner image transferred onto the recording medium. The electrostatic image developer used is the electrostatic image developer according to the present exemplary embodiment.

In the image forming apparatus according to the present exemplary embodiment, an image forming method (an image forming method according to the present exemplary embodiment) is performed. The image forming method includes: charging the surface of the image holding member; forming an electrostatic image on the charged surface of the image holding member; developing the electrostatic image formed on the surface of the image holding member with the electrostatic image developer according to the present embodiment to thereby form a toner image; transferring the toner image formed on the surface of the image holding member onto a recording medium; and fixing the toner image transferred onto the surface of the recording medium.

The image forming apparatus according to the present exemplary embodiment may be applied to known image forming apparatuses such as: a direct transfer-type apparatus that transfers a toner image formed on the surface of the image holding member directly onto a recording medium; an intermediate transfer-type apparatus that first-transfers a toner image formed on the surface of the image holding member onto the surface of an intermediate transfer body and second-transfers the toner image transferred onto the surface of the intermediate transfer body onto the surface of a recording medium; a cleaning device including cleaning means for cleaning the surface of the image holding member after the transfer of the toner image but before charging; and a charge eliminating device including charge eliminating means for eliminating charges on the surface of the image holding member after transfer of the toner image but before charging by irradiating the surface of the image holding member with charge eliminating light.

When the image forming apparatus according to the present exemplary embodiment is the intermediate transfer-type apparatus, the transferring device includes, for example: an intermediate transfer body having a surface onto which a toner image is to be transferred; a first transferring device that first-transfers a toner image formed on the surface of the image holding member onto the surface of the intermediate transfer body; and a second transferring device that second-transfers the toner image transferred onto the surface of the intermediate transfer body onto the surface of a recording medium.

In the image forming apparatus according to the present exemplary embodiment, for example, a portion including the developing device may have a cartridge structure (process cartridge) that is detachably attached to the image forming apparatus. The process cartridge used may be, for example, a process cartridge that contains the electrostatic image developer according to the present exemplary embodiment and includes the developing device.

An example of the image forming apparatus according to the present exemplary embodiment will be described, but this is not a limitation. In the following description, major components shown in FIG. 1 will be described, and description of other components will be omitted.

FIG. 1 a schematic configuration diagram showing the image forming apparatus according to the present exemplary embodiment.

The image forming apparatus shown in FIG. 1 includes first to fourth electrophotographic image forming units 10Y, 10M, 10C, and 10K (image forming means) that output yellow (Y), magenta (M), cyan (C), and black (K) images, respectively, based on color-separated image data. These image forming units (hereinafter may be referred to simply as "units") 10Y, 10M, 10C, and 10K are arranged so as to be spaced apart from each other horizontally by a prescribed distance. These units 10Y, 10M, 10C, and 10K may each be a process cartridge detachably attached to the image forming apparatus.

An intermediate transfer belt (an example of the intermediate transfer body) 20 is disposed above the units 10Y, 10M, 10C, and 10K so as to extend through these units. The intermediate transfer belt 20 is wound around a driving roller 22 and a support roller 24 and runs in a direction from the first unit 10Y toward the fourth unit 10K. A force is applied to the support roller 24 by, for example, an unillustrated spring in a direction away from the driving roller 22, so that a tension is applied to the intermediate transfer belt 20 wound around the rollers. An intermediate transfer body cleaner 30 is disposed on an image holding member-side surface of the intermediate transfer belt 20 so as to be opposed to the driving roller 22.

Yellow, magenta, cyan, and black toners contained in toner cartridges 8Y, 8M, 8C, and 8K, respectively, are supplied to developing devices 4Y, 4M, 4C, and 4K, respectively, of the units 10Y, 10M, 10C, and 10K.

The first to fourth units 10Y, 10M, 10C, and 10K have the same structure and operate similarly. Therefore, the first unit 10Y that is disposed upstream in the running direction of the intermediate transfer belt and forms a yellow image will be described as a representative unit.

The first unit 10Y includes a photoconductor 1Y serving as an image holding member. A charging roller (an example of the charging device) 2Y, an exposure unit (an example of the electrostatic image forming device) 3, a developing device 4Y, a first transfer roller 5Y (an example of the first transferring device), and a photoconductor cleaner (an example of the cleaning device) 6Y are disposed around the photoconductor 1Y in this order. The charging roller charges the surface of the photoconductor 1Y to a prescribed potential, and the exposure unit 3 exposes the charged surface to a laser beam 3Y according to a color-separated image signal to thereby form an electrostatic image. The developing device 4Y supplies a charged toner to the electrostatic image to develop the electrostatic image, and the first transfer roller 5Y transfers the developed toner image onto the intermediate transfer belt 20. The photoconductor cleaner 6Y removes the toner remaining on the surface of the photoconductor 1Y after the first transfer.

The first transfer roller 5Y is disposed on the inner side of the intermediate transfer belt 20 and placed at a position opposed to the photoconductor 1Y. Bias power sources (not shown) for applying a first transfer bias are connected to the respective first transfer rollers 5Y, 5M, 5C, and 5K of the units. The bias power sources are controlled by an unillustrated controller to change the values of transfer biases applied to the respective first transfer rollers.

A yellow image forming operation in the first unit 10Y will be described.

First, before the operation, the surface of the photoconductor 1Y is charged by the charging roller 2Y to a potential of −600 V to −800 V.

The photoconductor 1Y is formed by stacking a photosensitive layer on a conductive substrate (with a volume resistivity of, for example, $1\times10^{-6}$ Ω·cm or less at 20° C.). The photosensitive layer generally has a high resistance (equivalent to the resistance of a general resin) but has the property that, when irradiated with a laser beam, the specific resistance of a portion irradiated with the laser beam is changed. Therefore, the charged surface of the photoconductor 1Y is irradiated with a laser beam 3Y from the exposure unit 3 according to yellow image data sent from an unillustrated controller. An electrostatic image with a yellow image pattern is thereby formed on the surface of the photoconductor 1Y.

The electrostatic image is an image formed on the surface of the photoconductor 1Y by charging and is a negative latent image formed as follows. The specific resistance of the irradiated portions of the photosensitive layer irradiated with the laser beam 3Y decreases, and this causes charges on the surface of the photoconductor 1Y to flow. However, the charges in portions not irradiated with the laser beam 3Y remain present, and the electrostatic image is thereby formed.

The electrostatic image formed on the photoconductor 1Y rotates to a prescribed developing position as the photoconductor 1Y rotates. Then the electrostatic image on the photoconductor 1Y at the developing position is developed and visualized as a toner image by the developing device 4Y.

An electrostatic image developer containing, for example, at least a yellow toner and a carrier is contained in the developing device 4Y. The yellow toner is agitated in the developing device 4Y and thereby frictionally charged. The charged yellow toner has a charge with the same polarity (negative polarity) as the charge on the photoconductor 1Y and is held on a developer roller (an example of a developer holding member). As the surface of the photoconductor 1Y passes through the developing device 4Y, the yellow toner electrostatically adheres to charge-eliminated latent image portions on the surface of the photoconductor 1Y, and the latent image is thereby developed with the yellow toner. Then the photoconductor 1Y with the yellow toner image formed thereon continues running at a prescribed speed, and the toner image developed on the photoconductor 1Y is transported to a prescribed first transfer position.

When the yellow toner image on the photoconductor 1Y is transported to the first transfer position, a first transfer bias is applied to the first transfer roller 5Y, and an electrostatic force directed from the photoconductor 1Y toward the first transfer roller 5Y acts on the toner image, so that the toner image on the photoconductor 1Y is transferred onto the intermediate transfer belt 20. The transfer bias applied in this case has a (+) polarity opposite to the (−) polarity of the toner and is controlled to, for example, +10 μA in the first unit 10Y by the controller (not shown).

The toner remaining on the photoconductor 1Y is removed and collected by the photoconductor cleaner 6Y.

The first transfer biases applied to first transfer rollers 5M, 5C, and 5K of the second unit 10M and subsequent units are controlled in the same manner as in the first unit.

The intermediate transfer belt 20 with the yellow toner image transferred thereon in the first unit 10Y is sequentially transported through the second to fourth units 10M, 10C and 10K, and toner images of respective colors are superimposed and multi-transferred.

Then the intermediate transfer belt 20 with the four color toner images multi-transferred thereon in the first to fourth units reaches a second transfer portion that is composed of the intermediate transfer belt 20, the support roller 24 in contact with the inner surface of the intermediate transfer belt, and a second transfer roller (an example of the second transferring device) 26 disposed on the image holding surface side of the intermediate transfer belt 20. A recording paper sheet (an example of the recording medium) P is supplied to a gap between the second transfer roller 26 and the intermediate transfer belt 20 in contact with each other at a prescribed timing through a supply mechanism, and a second transfer bias is applied to the support roller 24. The transfer bias applied in this case has the same polarity (−) as the polarity (−) of the toner, and an electrostatic force directed from the intermediate transfer belt 20 toward the recording paper sheet P acts on the toner image, so that the toner image on the intermediate transfer belt 20 is transferred onto the recording paper sheet P. In this case, the second transfer bias is determined according to a resistance detected by resistance detection means (not shown) for detecting the resistance of the second transfer portion and is voltage-controlled.

Then the recording paper sheet P is transported to a press contact portion (nip portion) of a pair of fixing rollers in a fixing device 28, and the toner image is fixed onto the recording paper sheet P to thereby form a fixed image.

Examples of the recording paper sheet Ponto which a toner image is to be transferred include plain paper sheets used for electrophotographic copying machines, printers, etc. Examples of the recording medium include, in addition to the recording paper sheets P, transparencies.

To further improve the smoothness of the surface of a fixed image, it may be necessary that the surface of the recording paper sheet P be smooth. For example, coated paper prepared by coating the surface of plain paper with, for example, a resin, art paper for printing, etc. are suitably used.

The recording paper sheet P with the color image fixed thereon is transported to an ejection portion, and a series of the color image formation operations is thereby completed.

[Process Cartridge]

A process cartridge according to the present exemplary embodiment includes a developing device that houses the electrostatic image developer according to the present exemplary embodiment and develops an electrostatic image formed on the surface of an image holding member with the electrostatic image developer to thereby form a toner image. The process cartridge is to be detachably attached to the image forming apparatus.

The structure of the process cartridge according to the present exemplary embodiment is not limited to the above described structure. The process cartridge may include, in addition to the developing device, at least one optional unit selected from other devices such as an image holding member, a charging device, an electrostatic image forming device, and a transferring device.

An example of the process cartridge according to the present exemplary embodiment will be described, but this is not a limitation. In the following description, major components shown in FIG. 2 will be described, and description of other components will be omitted.

Figure 2:
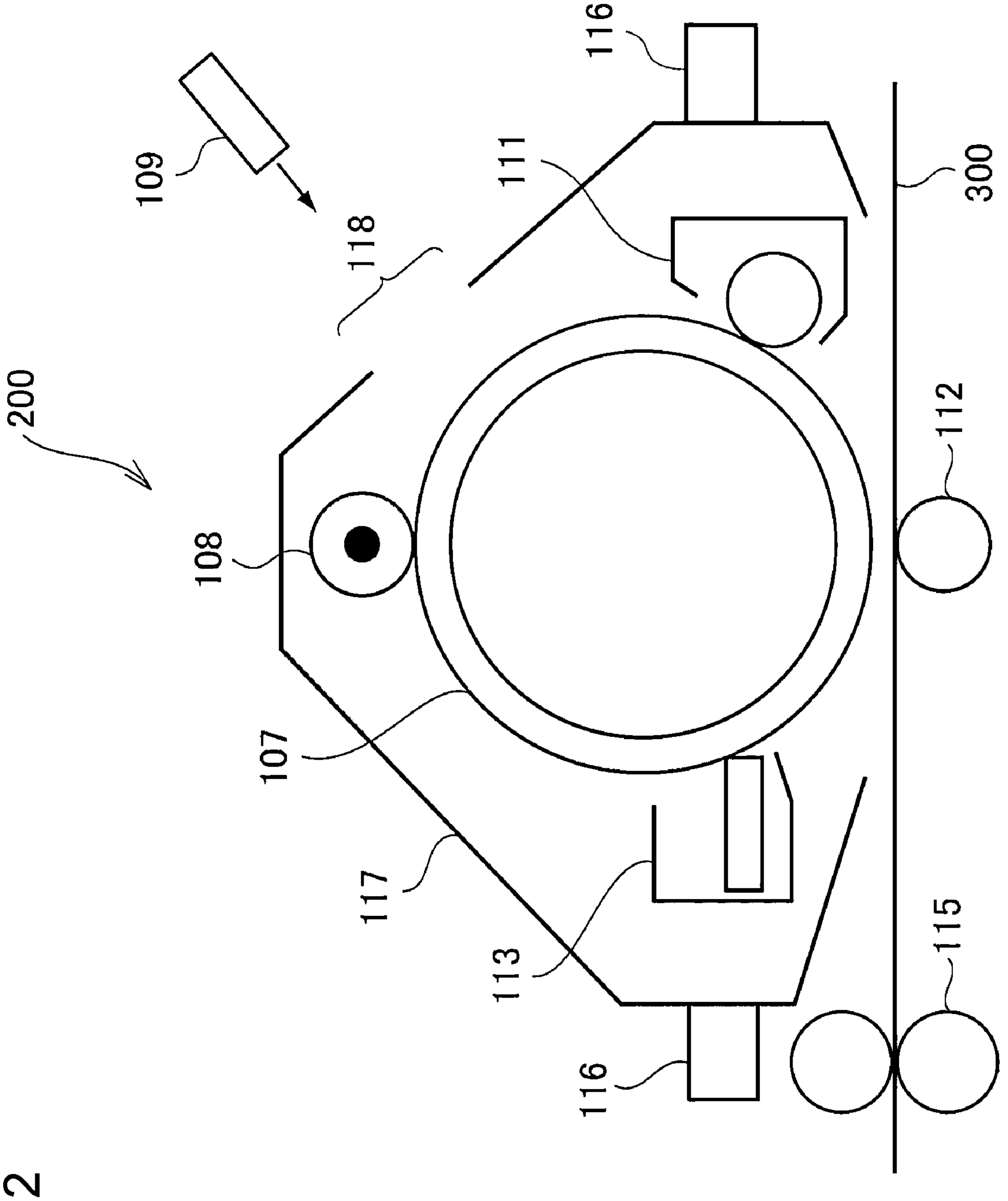
FIG. 2 is a schematic configuration diagram showing an example of a process cartridge detachably attached to the image forming apparatus according to the exemplary embodiment.

FIG. 2 is a schematic configuration diagram showing the process cartridge according to the present exemplary embodiment.

The process cartridge 200 shown in FIG. 2 includes, for example, a housing 117 including mounting rails 116 and an opening 118 for light exposure and further includes a photoconductor 107 (an example of the image holding member), a charging roller 108 (an example of the charging device) disposed on the circumferential surface of the photoconductor 107, a developing device 111, and a photoconductor cleaner 113 (an example of the cleaning device), which are integrally combined and held in the housing 117 to thereby form a cartridge.

In FIG. 2, 109 denotes an exposure unit (an example of the electrostatic image forming device), and 112 denotes a transferring device. 115 denotes a fixing device, and 300 denotes a recording paper sheet.

EXAMPLES

The exemplary embodiment of the disclosure will be described in detail by way of Examples. However, the exemplary embodiment of the disclosure is not limited to these Examples. In the following description, "parts" and "%" are based on mass, unless otherwise specified.

[Production of Ferrite Particles]

<Production of Ferrite Particles (1)>

1318 Parts of $Fe_2O_3$, 587 parts of $Mn(OH)_2$, and 96 parts of $Mg(OH)_2$ are mixed and calcined at a temperature of 900° C. for 4 hours. The calcined product, 6.6 parts of polyvinyl alcohol, 0.5 parts of polycarboxylic acid used as a dispersant, and zirconia beads having a media diameter of 1 mm are added, and the resulting mixture is pulverized and stirred in a sand mill to obtain a dispersion. The volume average particle diameter of the particles in the dispersion is 1.5 μm.

The dispersion is used as a raw material, granulated, and dried using a spray dryer to obtain a particulate material having a volume average particle diameter of 37 μm. Next, the particulate material is fired at a temperature of 1450° C. for 4 hours using an electric furnace in an oxygen-nitrogen mixture atmosphere with an oxygen partial pressure of 1% and then heated to a temperature of 900° C. for 3 hours in air to thereby obtain fired particles. The fired particles are pulverized and classified to obtain ferrite particles (1) having a number average particle diameter of 31 μm.

[Production of Carrier (1)]

<Production of Resin Solution>

Resin (1): Cyclohexyl methacrylate polymer (weight average molecular weight: 350,000) 15.4 parts Resin (2): 2-(Dimethylamino)ethyl methacrylate polymer (weight average molecular weight: 300,000) 0.39 parts Nitrogen-containing resin particles: Melamine resin particles (EPOSTAR S (manufactured by NIPPON SHOKUBAI Co., Ltd.)) 3.0 parts Carbon black particles (1): Carbon black (DBP oil absorption: 174 mL/100 g, pH: 8.5, number average primary particle diameter: 30 nm, BET specific surface area: 254 $m^2/g$, specific gravity: 1.8, product of Cabot Corporation, product name: VXC72) 2.24 parts Inorganic particles (1): Silica (number average primary particle diameter: 7 nm, specific gravity: 2.2, fumed silica particles subjected to surface treatment with hexamethyldisilazane, product of Tokuyama Corporation, product name: HM30S) 7.0 parts Solvent: Toluene 300 parts The above materials and glass beads (diameter: 1 mm, the same amount as toluene) are placed in a sand mill and stirred at a rotation speed of 190 rpm for 30 minutes to thereby obtain a resin solution (1).

<Production of Carrier>

1000 Parts of the ferrite particles (1) and 180 parts of the resin solution (1) are placed in a vacuum degassed-type kneader and stirred at 75° C. and −20 kPa (gauge pressure) for 2 hours and then heated to 85° C., and toluene is removed by evaporation at a vacuum of −90 kPa (gauge pressure) to thereby form a carrier including the ferrite particles coated with the resin. Then fine powders and coarse powders are removed using an Elbow-Jet to thereby obtain a carrier (1). The method described above is used to check the structure of the resin coating layer of the carrier (1) obtained, and the resin coating layer is found to have a sea-island structure including aggregates of the carbon black particles dispersed therein.

[Production of Carrier (2)]

<Production of Resin Solution>

A resin solution (2) is obtained using the same procedure as that for the resin solution (1) except that 2.24 parts of carbon black particles (2) (DBP oil absorption: 100 mL/100 g, number average primary particle diameter: 10 nm, BET specific surface area: 500 $m^2/g$, specific gravity: 1.8, product of Cabot Corporation, product name: VXC72) are added instead of the carbon black particles (1) and that 2.4 parts of inorganic particles (2) (number average primary particle diameter: 1 nm, specific gravity: 2.2, fumed silica particles subjected to surface treatment with hexamethyldisilazane, product of Tokuyama Corporation, product name: HM30S) are added instead of the inorganic particles (1).

<Production of Carrier>

A carrier (2) is obtained using the same procedure as that for the carrier (1) except that the resin solution (2) is used instead of the resin solution (1). The method described above is used to check the structure of the resin coating layer of the carrier (2) obtained, and the resin coating layer is found to have a sea-island structure including aggregates of the carbon black particles dispersed therein.

[Production of Carrier (3)]

<Production of Resin Solution>

A resin solution (3) is obtained using the same procedure as that for the resin solution (1) except that 2.24 parts of carbon black particles (3) (DBP oil absorption: 400 mL/100 g, number average primary particle diameter: 100 nm, BET specific surface area: 50 $m^2/g$, specific gravity: 1.8, product of Cabot Corporation, product name: VXC72) are added instead of the carbon black particles (1) and that 14.2 parts of inorganic particles (3) (number average primary particle diameter: 80 nm, specific gravity: 2.2, fumed silica particles subjected to surface treatment with hexamethyldisilazane, product of Tokuyama Corporation, product name: HM30S) are added instead of the inorganic particles (1).

<Production of Carrier>

A carrier (3) is obtained using the same procedure as that for the carrier (1) except that the resin solution (3) is used instead of the resin solution (1). The method described above is used to check the structure of the resin coating layer of the carrier (3) obtained, and the resin coating layer is found to have a sea-island structure including aggregates of the carbon black particles dispersed therein.

[Production of Carrier (4)]

<Production of Resin Solution>

A resin solution (4) is obtained using the same procedure as that for the resin solution (1) except that the amount of the carbon black particles (1) added is changed to 5.0 parts.

<Production of Carrier>

A carrier (4) is obtained using the same procedure as that for the carrier (1) except that the resin solution (4) is used instead of the resin solution (1) and that the stirring conditions are changed to 75° C. and −20 kPa for 90 minutes. The method described above is used to check the structure of the resin coating layer of the carrier (4) obtained, and the resin coating layer is found to have a sea-island structure including aggregates of the carbon black particles dispersed therein.

[Production of Carrier (5)]

<Production of Resin Solution>

A resin solution (5) is obtained using the same procedure as that for the resin solution (1) except that 2.24 parts of carbon black particles (5) (DBP oil absorption: 200 mL/100 g, number average primary particle diameter: 50 nm, BET specific surface area: 200 $m^2/g$, specific gravity: 1.8, product of Cabot Corporation, product name: VXC72) are added instead of the carbon black particles (1) and that 5.3 parts of inorganic particles (5) (number average primary particle diameter: 15 nm, specific gravity: 2.2, fumed silica particles subjected to surface treatment with hexamethyldisilazane, product of Tokuyama Corporation, product name: HM30S) are added instead of the inorganic particles (1).

<Production of Carrier>

A carrier (5) is obtained using the same procedure as that for the carrier (1) except that the resin solution (5) is used instead of the resin solution (1). The method described above is used to check the structure of the resin coating layer of the carrier (5) obtained, and the resin coating layer is found to have a sea-island structure including aggregates of the carbon black particles dispersed therein.

[Production of Carrier (6)]

<Production of Resin Solution>

A resin solution (6) is obtained using the same procedure as that for the resin solution (1) except that 2.24 parts of carbon black particles (6) (DBP oil absorption: 300 mL/100 g, number average primary particle diameter: 50 nm, BET specific surface area: 200 $m^2/g$, specific gravity: 1.8, product of Cabot Corporation, product name: VXC72) are added instead of the carbon black particles (1) and that 5.3 parts of inorganic particles (5) (number average primary particle diameter: 15 nm, specific gravity: 2.2, fumed silica particles subjected to surface treatment with hexamethyldisilazane, product of Tokuyama Corporation, product name: HM30S) are added instead of the inorganic particles (1).

<Production of Carrier>

A carrier (6) is obtained using the same procedure as that for the carrier (1) except that the resin solution (6) is used instead of the resin solution (1). The method described above is used to check the structure of the resin coating layer of the carrier (6) obtained, and the resin coating layer is found to have a sea-island structure including aggregates of the carbon black particles dispersed therein.

[Production of Carrier (7)]

<Production of Resin Solution>

A resin solution (7) is obtained using the same procedure as that for the resin solution (1) except that the amount of the inorganic particles (1) added is changed to 1.1 parts.

<Production of Carrier>

A carrier (7) is obtained using the same procedure as that for the carrier (1) except that the resin solution (7) is used instead of the resin solution (1). The method described above is used to check the structure of the resin coating layer of the carrier (7) obtained, and the resin coating layer is found to have a sea-island structure including aggregates of the carbon black particles dispersed therein.

[Production of Carrier (8)]

<Production of Resin Solution>

A resin solution (8) is obtained using the same procedure as that for the resin solution (1) except that 2.24 parts of carbon black particles (5) (DBP oil absorption: 200 mL/100 g, number average primary particle diameter: 50 nm, BET specific surface area: 200 $m^2/g$, specific gravity: 1.8, product of Cabot Corporation, product name: VXC72) are added instead of the carbon black particles (1) and that 7 parts of inorganic particles (3) (number average primary particle diameter: 80 nm, specific gravity: 2.2, fumed silica particles subjected to surface treatment with hexamethyldisilazane, product of Tokuyama Corporation, product name: HM30S) are added instead of the inorganic particles (1).

<Production of Carrier>

A carrier (8) is obtained using the same procedure as that for the carrier (1) except that the resin solution (8) is used instead of the resin solution (1). The method described above is used to check the structure of the resin coating layer of the carrier (8) obtained, and the resin coating layer is found to have a sea-island structure including aggregates of the carbon black particles dispersed therein.

[Production of Carrier (9)]

A carrier (9) is obtained using the same procedure as that for the carrier (1) except that the amount of the resin solution (1) placed in the vacuum degassed-type kneader is reduced. The method described above is used to check the structure of the resin coating layer of the carrier (9) obtained, and the resin coating layer is found to have a sea-island structure including aggregates of the carbon black particles dispersed therein.

[Production of Carrier (10)]

A carrier (10) is obtained using the same procedure as that for the carrier (1) except that the amount of the resin solution (1) placed in the vacuum degassed-type kneader is increased. The method described above is used to check the structure of the resin coating layer of the carrier (10) obtained, and the resin coating layer is found to have a sea-island structure including aggregates of the carbon black particles dispersed therein.

[Production of Carrier (11)]

<Production of Resin Solution>

A resin solution (11) is obtained using the same procedure as that for the resin solution (1) except that the amount of the inorganic particles (1) added is changed to 3.0 parts.

<Production of Carrier>

A carrier (11) is obtained using the same procedure as that for the carrier (1) except that the resin solution (11) is used instead of the resin solution (1), that the mixture is stirred in the vacuum degassed-type kneader at 65° C. and −20 kPa for 70 minutes and then heated to 75° C., and that toluene is removed by evaporation at a vacuum of −80 kPa. The method described above is used to check the structure of the resin coating layer of the carrier (11) obtained, and the resin coating layer is found to have a sea-island structure including aggregates of the carbon black particles dispersed therein.

[Production of Carrier (12)]

A carrier (12) is obtained using the same procedure as that for the carrier (1) except that the amount of the resin solution (1) placed in the vacuum degassed-type kneader is reduced. The method described above is used to check the structure of the resin coating layer of the carrier (12) obtained, and the resin coating layer is found to have a sea-island structure including aggregates of the carbon black particles dispersed therein.

[Production of Carrier (13)]

A carrier (13) is obtained using the same procedure as that for the carrier (1) except that the amount of the resin solution (1) placed in the vacuum degassed-type kneader is increased. The method described above is used to check the structure of the resin coating layer of the carrier (13) obtained, and the resin coating layer is found to have a sea-island structure including aggregates of the carbon black particles dispersed therein.

[Production of Carrier (14)]

<Production of Resin Solution>

A resin solution (14) is obtained using the same procedure as that for the resin solution (1) except that the inorganic particles (1) are not added.

<Production of Carrier>

A carrier (14) is obtained using the same procedure as that for the carrier (1) except that the resin solution (14) is used instead of the resin solution (1) and that the mixture is stirred in the vacuum degassed-type kneader at 95° C. and −20 kPa for 180 minutes and then the degree of vacuum is changed to −99 kPa. The method described above is used to check the structure of the resin coating layer of the carrier (14) obtained, and the resin coating layer is found to have a sea-island structure including aggregates of the carbon black particles dispersed therein.

[Production of Carrier (15)]

A carrier (15) is obtained using the same procedure as that for the carrier (1) except that the mixture is stirred in the vacuum degassed-type kneader at 60° C. and −20 kPa for 1 hour and then heated to 70° C. and that toluene is removed by evaporation at a vacuum of −75 kPa. The method described above is used to check the structure of the resin coating layer of the carrier (15) obtained, and the resin coating layer is found to have agglomerate structures formed by secondary aggregation of aggregates of the carbon black particles.

[Production of Carrier (16)]

<Production of Resin Solution>

A resin solution (16) is obtained using the same procedure as that for the resin solution (1) except that the amount of the carbon black particles (1) added is changed to 4.0 parts.

<Production of Carrier>

A carrier (16) is obtained using the same procedure as that for the carrier (1) except that the resin solution (16) is used instead of the resin solution (1), that the mixture is stirred in the vacuum degassed-type kneader at 70° C. and −20 kPa for 1.5 hours and then heated to 80° C., and that toluene is removed by evaporation at a vacuum of −85 kPa. The method described above is used to check the structure of the resin coating layer of the carrier (16) obtained, and the resin coating layer is found to have a sea-island structure including aggregates of the carbon black particles dispersed therein.

[Production of Carrier (17)]

<Production of Resin Solution>

A resin solution (17) is obtained using the same procedure as that for the resin solution (1) except that the inorganic particles (1) are not added.

<Production of Carrier>

A carrier (17) is obtained using the same procedure as that for the carrier (1) except that the resin solution (17) is used instead of the resin solution (1). The method described above is used to check the structure of the resin coating layer of the carrier (17) obtained, and the resin coating layer is found to have agglomerate structures formed by secondary aggregation of aggregates of the carbon black particles.

[Production of Carrier (18)]

<Production of Resin Solution>

A resin solution (18) is obtained using the same procedure as that for the resin solution (1) except that the amount of the inorganic particles (1) added is changed to 15 parts.

<Production of Carrier>

A carrier (18) is obtained using the same procedure as that for the carrier (1) except that the resin solution (18) is used instead of the resin solution (1), that the siring conditions are changed to 90° C. and −20 kPa for 150 minutes, and that the drying conditions are changed to 100° C. and −99 kPa. The method described above is used to check the structure of the resin coating layer of the carrier (18) obtained, and the resin coating layer is found to have no sea-island structure including aggregates of the carbon black particles dispersed therein and no agglomerate structures formed by secondary aggregation of aggregates of the carbon black particles.

For each of the carriers obtained, the average thickness of the resin coating layer ("Average thickness" in Table 1), the number average equivalent circle diameter of the aggregates of the carbon black particles ("Average diameter of aggregates" in the table), the specific aggregate ratio ("Specific ratio" in the table), the ratio of the total area of aggregates satisfying formula (2) below to the total area of the resin coating layer ("Formula (2) ratio" in the table), and the number of cross sections of the specific aggregates present in a 2 μm×2 μm square ("Specific number" in the table) are determined by the methods described above and shown in Table 1.

[Production of Developers]

One of the carriers (1) to (18) obtained and a toner obtained by a method described later are placed in a V blender in a mass ratio of carrier:toner=100:10 and stirred for 20 minutes to thereby obtain one of developers (1) to (18).

[Evaluation]

<Evaluation of Fine Line Reproducibility>

One of the developers is placed in an image forming apparatus (obtained by modifying DocuCentre Color 400) and left to stand in an environment at a temperature of 30° C. and a relative humidity of 88% for 12 hours. After standing, an image is formed continuously on 1000 A4 paper sheets. The image is a 20 cm×25 cm image with a density of 100% and formed in a longitudinally upper portion of each sheet, and alphabetical characters A to Z are formed below the image in an MS Gothic 14-point half-size font. The conditions of the characters on the last 10 of the 1000 sheets are visually checked and classified as follows. The results are shown in Table 1 ("Fine line reproducibility" in the table).

<Evaluation of Starvation (Color Fading)>

One of the developers is placed in an image forming apparatus (obtained by modifying DocuCentre Color 400) and left to stand in a 10° C./RH15% environment for 3 days. An image with an area coverage of 1% is outputted onto 100 A4 paper sheets, and then an evaluation chart including a combination of halftone and solid images is outputted on 10 sheets. The degree of color fading at the rear edge of each solid image is visually checked. The evaluation criteria are as follows. The results are shown in Table 1 ("Color fading" in the table).

A: Almost no color fading is found.

B: Slight color fading is found (the rear edge is whitish and hazy).

C: Color fading is found (color fading width≤1 mm)

D: Significant color fading is found (color fading width >1 mm)

TABLE 1

| | Carrier | Carbon black: DBP oil absorption (ml/100 g) | Carbon black: Particle diameter (nm) | Inorganic particles: Particle diameter (nm) | Inorganic particles: Amount added (parts) | Resin coating layer: Average thickness (μm) | Resin coating layer: Average diameter of aggregates (nm) | Resin coating layer: Specific ratio (%) | Resin coating layer: Formula (2) ratio (%) | Resin coating layer: Specific number (number of cross sections) | Evaluation: Fine line repro-ducibility | Evaluation: Color fading |
|---|---|---|---|---|---|---|---|---|---|---|---|---|
| Example 1 | (1) | 174 | 30 | 7 | 7 | 1 | 400 | 30 | 20 | 6 | A | A |
| Example 2 | (2) | 100 | 10 | 1 | 2.4 | 0.5 | 100 | 10 | 5 | 2 | D | A |
| Example 3 | (3) | 400 | 100 | 80 | 14.2 | 1 | 800 | 50 | 40 | 10 | D | A |
| Example 4 | (4) | 174 | 30 | 7 | 7 | 1 | 400 | 30 | 20 | 15 | C | A |
| Example 5 | (5) | 200 | 50 | 15 | 5.3 | 1 | 400 | 30 | 20 | 7 | B | A |
| Example 6 | (6) | 300 | 50 | 15 | 5.3 | 1 | 400 | 30 | 20 | 3 | B | A |
| Example 7 | (7) | 174 | 30 | 7 | 1.1 | 1 | 400 | 30 | 5 | 6 | D | A |
| Example 8 | (8) | 200 | 50 | 80 | 7 | 1 | 600 | 40 | 5 | 4 | D | A |
| Example 9 | (9) | 174 | 30 | 7 | 7 | 0.3 | 200 | 40 | 30 | 3 | C | A |
| Example 10 | (10) | 174 | 30 | 7 | 7 | 2.5 | 800 | 40 | 30 | 6 | C | C |
| Example 11 | (11) | 174 | 30 | 7 | 3 | 1 | 700 | 40 | 30 | 1 | C | B |
| Example 12 | (12) | 174 | 30 | 7 | 7 | 0.4 | 200 | 40 | 30 | 3 | B | A |
| Example 13 | (13) | 174 | 30 | 7 | 7 | 2 | 800 | 40 | 30 | 6 | B | B |
| Example 14 | (14) | 174 | 30 | — | — | 1 | 800 | 50 | 40 | 10 | D | A |
| Comparative Example 1 | (15) | 174 | 30 | 7 | 7 | 1 | 900 | 0 | 0 | 0 | F | A |
| Comparative Example 2 | (16) | 174 | 30 | 7 | 7 | 1 | 200 | 60 | 50 | 9 | F | A |
| Comparative Example 3 | (17) | 174 | 30 | — | — | 1 | 900 | 0 | 0 | 0 | F | A |
| Comparative Example 4 | (18) | 174 | 30 | 7 | 15 | 1 | 30 | 0 | 0 | 0 | F | D |

A: No lines are found to be thickened, crushed together, or blurred in any of the last 10 sheets.

B: Some lines are found to be slightly thickened, crushed together, or blurred in 2 to 3 of the last 10 sheets, but the fine lines can be recognized.

C: Some lines are found to be thickened, crushed together, or blurred in 2 to 3 of the last 10 sheets. However, the degree of thickening, crushing, or blurring is small, and the sheets can be used practically without any problem.

D: Some lines are found to be thickened, crushed together, or blurred in at least two of the last 10 sheets, and the fine lines in these sheets are partially missing.

E: Some lines are found to be thickened, crushed together, or blurred in three of the last 10 sheets, and the fine lines in these sheets are partially missing.

F: Some lines are found to be thickened, crushed together, or blurred in at least four of the last 10 sheets, and the fine lines in these sheets are partially missing.

As can be seen from the above results, in the Examples, the improvement in the fine line reproducibility in images that are formed using the image forming apparatus when the apparatus is operated after standing at high temperature and high humidity for a long time and the reduction in the occurrence of color fading at edges of high-density images continuously formed at low temperature and low humidity are both better than those in the Comparative Examples.

[Production of Toner]

The toner used to produce the developers is obtained by the following method.

<Preparation of Resin Particle Dispersion (1)>

Ethylene glycol (FUJIFILM Wako Pure Chemical Corporation) 37 parts

Neopentyl glycol (FUJIFILM Wako Pure Chemical Corporation) 65 parts 1,9-Nonanediol (FUJIFILM Wako Pure Chemical Corporation) 32 parts Terephthalic acid (FUJIFILM Wako Pure Chemical Corporation) 96 parts The above materials are placed in a flask and heated to a temperature of 200° C. over 1 hour. After confirmation that the reaction system has been uniformly stirred, 1.2 parts of dibutyl tin oxide is added. The resulting mixture is heated to 240° C. over 6 hours while water generated is removed by evaporation. The stirring is continued at 240° C. for 4 hours, and a polyester resin (acid value: 9.4 mgKOH/g, weight average molecular weight: 13,000, glass transition temperature: 62° C.) is thereby obtained. The polyester resin in a molten state is transferred to an emulsifying-dispersing apparatus (CAVITRON CD1010, EUROTEC Co., Ltd.) at a rate of 100 g/minute. Separately, diluted ammonia water prepared by diluting reagent ammonia water with ion exchanged water to a concentration of 0.37% is placed in a tank. While heated to 120° C. using a heat exchanger, the diluted ammonia water, together with the polyester resin, is transferred to the emulsifying-dispersing apparatus at a rate of 0.1 L/minute. The emulsifying-dispersing apparatus is operated under the following conditions: rotor rotation speed: 60 Hz; and pressure: 5 kg/cm$^2$. A resin particle dispersion (1) with a volume average particle diameter of 160 nm and a solid content of 30% is thereby obtained.

<Preparation of Resin Particle Dispersion (2)>

Decanedioic acid (TOKYO CHEMICAL INDUSTRY Co., Ltd.) 81 parts

Hexanediol (FUJIFILM Wako Pure Chemical Corporation) 47 parts

The above materials are placed in a flask and heated to 160° C. over 1 hour. After confirmation that the reaction system has been uniformly stirred, 0.03 parts of dibutyl tin oxide is added. The resulting mixture is heated to 200° C. over 6 hours while water generated is removed by evaporation, and the stirring is continued at 200° C. for 4 hours. Then the reaction solution is cooled and subjected to solid-liquid separation. The solid is dried at a temperature of 40° C. under reduced pressure to thereby obtain a polyester resin (C1) (melting point: 64° C., weight average molecular weight: 15,000).

Polyester resin (C1) 50 parts

Anionic surfactant (Neogen SC, DAI-ICHI KOGYO SEIYAKU Co., Ltd.) 2 parts

Ion exchanged water 200 parts

The above materials are heated to 120° C., dispersed sufficiently using a homogenizer (ULTRA-TURRAX T50, IKA), and then subjected to dispersion treatment using a pressure discharge-type homogenizer. When the volume average particle diameter has reached 180 nm, the product is collected, and a resin particle dispersion (2) with a solid content of 20% is thereby obtained.

<Preparation of Coloring Agent Particle Dispersion (1)>

Cyan pigment (Pigment Blue 15:3, Dainichiseika Color & Chemicals Mfg. Co., Ltd.) 10 parts Anionic surfactant (Neogen SC, DAI-ICHI KOGYO SEIYAKU Co., Ltd.) 2 parts Ion exchanged water 80 parts The above materials are mixed and dispersed for 1 hour using a high-pressure impact disperser (Ultimaizer HJP30006, Sugino Machine Limited) to thereby obtain a coloring agent particle dispersion (1) with a volume average particle diameter of 180 nm and a solid content of 20%.

<Preparation of Release Agent Particle Dispersion (1)>

Paraffin wax (HNP-9, Nippon Seiro Co., Ltd.) 50 parts

Anionic surfactant (Neogen SC, DAI-ICHI KOGYO SEIYAKU Co., Ltd.) 2 parts

Ion exchanged water 200 parts

The above materials are heated to 120° C., dispersed sufficiently using a homogenizer (ULTRA-TURRAX T50, IKA), and then subjected to dispersion treatment using a pressure discharge-type homogenizer. When the volume average particle diameter has reached 200 nm, the product is collected, and a release agent particle dispersion (1) with a solid content of 20% is thereby obtained.

<Production of Toner Particles>

Resin particle dispersion (1) 150 parts

Resin particle dispersion (2) 50 parts

Coloring agent particle dispersion (1) 25 parts

Release agent particle dispersion (1) 35 parts

Polyaluminum chloride 0.4 parts

Ion exchanged water 100 parts

The above materials are placed in a stainless steel-made round flask, mixed and dispersed sufficiently using a homogenizer (ULTRA-TURRAXT50, IKA), and then heated to 48° C. in an oil bath for heating while the mixture in the flask is stirred. The reaction system is held at 48° C. for 60 minutes, and then an additional 70 parts of the resin particle dispersion (1) is gently added. Next, a 0.5 mol/L aqueous sodium hydroxide solution is used to adjust the pH to 8.0. The flask is hermetically sealed, and a stirring shaft is magnetically sealed. While the stirring is continued, the reaction system is heated to 90° C. and held for 30 minutes. Next, the resulting mixture is cooled at a cooling rate of 5° C./minute and subjected to solid-liquid separation, and the solid is washed sufficiently with ion exchanged water. Then the resulting mixture is subjected to solid-liquid separation, and the solid is re-dispersed in ion exchanged water at 30° C. and washed by stirring at a rotation speed of 300 rpm for 15 minutes. This washing procedure is repeated 6 times. When the pH of the filtrate has reached 7.54 and its electric conductivity has reached 6.5 μS/cm, the mixture is subjected to solid-liquid separation, and vacuum drying is continued for 24 hours to thereby obtain toner particles (1) having a volume average particle diameter of 5.7 μm.

<External Addition to Toner Particles>

100 Parts of the toner particles (1) and 0.7 parts of hydrophobic silica (RY50 manufactured by Nippon Aerosil Co., Ltd.) are mixed using a Henschel mixer to thereby obtain a toner.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1))) A carrier for electrostatic image development including:

a core material; and a resin coating layer that covers the core material and contains a resin and carbon black particles, wherein the resin coating layer has an average thickness denoted as B μm and contains aggregates of the carbon black particles, the aggregates having equivalent circle diameters denoted as A μm, the aggregates satisfying formula (1) below, and wherein, in a cross section of the resin coating layer, the ratio of the total area of the aggregates satisfying formula (1) below to the total area of the resin coating layer is 10% or more and 50% or less:

$$0.2 \times B \leq A \leq 0.8 \times B. \quad \text{Formula (1)}$$

(((2))) The carrier for electrostatic image development according to (((1))), wherein the resin coating layer further contains inorganic particles other than the carbon black particles.

(((3))) The carrier for electrostatic image development according to (((2))), wherein the number average primary particle diameter of the inorganic particles is smaller than the number average primary particle diameter of the carbon black particles.

(((4))) The carrier for electrostatic image development according to any one of (((1))) to (((3))), wherein the number of cross sections of the aggregates that satisfy formula (1) above and are present in a 2 μm×2 μm square in the cross section of the resin coating layer is 2 or more and 10 or less.

(((5))) The carrier for electrostatic image development according to any one of (((1))) to (((4))), wherein the average thickness of the resin coating layer is 0.3 μm or more and 3 μm or less.

(((6))) The carrier for electrostatic image development according to (((5))), wherein the average thickness of the resin coating layer is 0.4 μm or more and 2 μm or less.

(((7))) An electrostatic image developer including:

a toner for electrostatic image development; and the carrier for electrostatic image development according to any one of (((1))) to (((6))).

(((8))) A process cartridge including a developing device that houses the electrostatic image developer according to (((7))) and develops an electrostatic image formed on a surface of an image holding member with the electrostatic image developer to thereby form a toner image, wherein the process cartridge is to be detachably attached to an image forming apparatus.

(((9))) An image forming apparatus including:

an image holding member;

a charging device that charges a surface of the image holding member;

an electrostatic image forming device that forms an electrostatic image on the charged surface of the image holding member;

a developing device that houses the electrostatic image developer according to (((7))) and develops the electrostatic image formed on the surface of the image holding member with the electrostatic image developer to thereby form a toner image;

a transferring device that transfers the toner image formed on the surface of the image holding member onto a surface of a recording medium; and a fixing device that fixes the toner image transferred onto the surface of the recording medium.

(((10))) An electrostatic image forming method including:

charging a surface of an image holding member;

forming an electrostatic image on the charged surface of the image holding member; developing the electrostatic image formed on the surface of the image holding member with the electrostatic image developer according to (((7))) to thereby form a toner image;

transferring the toner image formed on the surface of the image holding member onto a surface of a recording medium; and fixing the toner image transferred onto the surface of the recording medium.

What is claimed is:

1. A carrier for electrostatic image development comprising:

a core material; and a resin coating layer that covers the core material and contains a resin and carbon black particles, wherein the resin coating layer has an average thickness denoted as B μm and contains aggregates of the carbon black particles, the aggregates having equivalent circle diameters denoted as A μm, the aggregates satisfying formula (1) below, and wherein, in a cross section of the resin coating layer, the ratio of the total area of the aggregates satisfying formula (1) below to the total area of the resin coating layer is 10% or more and 50% or less:

$$0.2 \times B \leq A \leq 0.8 \times B. \quad \text{Formula (1)}$$

2. The carrier for electrostatic image development according to claim 1, wherein the resin coating layer further contains inorganic particles other than the carbon black particles.

3. The carrier for electrostatic image development according to claim 2, wherein the number average primary particle diameter of the inorganic particles is smaller than the number average primary particle diameter of the carbon black particles.

4. An electrostatic image developer comprising:

a toner for electrostatic image development; and the carrier for electrostatic image development according to claim 3.

5. A process cartridge comprising a developing device that houses the electrostatic image developer according to claim 4 and develops an electrostatic image formed on a surface of an image holding member with the electrostatic image developer to thereby form a toner image, wherein the process cartridge is to be detachably attached to an image forming apparatus.

6. An electrostatic image developer comprising:

a toner for electrostatic image development; and the carrier for electrostatic image development according to claim 2.

7. A process cartridge comprising a developing device that houses the electrostatic image developer according to claim 6 and develops an electrostatic image formed on a surface of an image holding member with the electrostatic image developer to thereby form a toner image, wherein the process cartridge is to be detachably attached to an image forming apparatus.

8. The carrier for electrostatic image development according to claim 1, wherein the number of cross sections of the aggregates that satisfy formula (1) above and are present in a 2 μm×2 μm square in the cross section of the resin coating layer is 2 or more and 10 or less.

9. An electrostatic image developer comprising:

a toner for electrostatic image development; and the carrier for electrostatic image development according to claim 8.

10. A process cartridge comprising a developing device that houses the electrostatic image developer according to claim 9 and develops an electrostatic image formed on a surface of an image holding member with the electrostatic image developer to thereby form a toner image, wherein the process cartridge is to be detachably attached to an image forming apparatus.

11. The carrier for electrostatic image development according to claim 1, wherein the average thickness of the resin coating layer is 0.3 μm or more and 3 μm or less.

12. The carrier for electrostatic image development according to claim 11, wherein the average thickness of the resin coating layer is 0.4 μm or more and 2 μm or less.

13. An electrostatic image developer comprising:

a toner for electrostatic image development; and the carrier for electrostatic image development according to claim 12.

14. A process cartridge comprising a developing device that houses the electrostatic image developer according to claim 13 and develops an electrostatic image formed on a surface of an image holding member with the electrostatic image developer to thereby form a toner image, wherein the process cartridge is to be detachably attached to an image forming apparatus.

15. An electrostatic image developer comprising:

a toner for electrostatic image development; and the carrier for electrostatic image development according to claim 11.

16. A process cartridge comprising a developing device that houses the electrostatic image developer according to claim 15 and develops an electrostatic image formed on a surface of an image holding member with the electrostatic image developer to thereby form a toner image, wherein the process cartridge is to be detachably attached to an image forming apparatus.

17. An electrostatic image developer comprising:

a toner for electrostatic image development; and the carrier for electrostatic image development according to claim 1.

18. A process cartridge comprising a developing device that houses the electrostatic image developer according to claim 17 and develops an electrostatic image formed on a surface of an image holding member with the electrostatic image developer to thereby form a toner image, wherein the process cartridge is to be detachably attached to an image forming apparatus.

19. An image forming apparatus comprising:

an image holding member;

a charging device that charges a surface of the image holding member;

an electrostatic image forming device that forms an electrostatic image on the charged surface of the image holding member;

a developing device that houses the electrostatic image developer according to claim 17 and develops the electrostatic image formed on the surface of the image holding member with the electrostatic image developer to thereby form a toner image;

a transferring device that transfers the toner image formed on the surface of the image holding member onto a surface of a recording medium; and a fixing device that fixes the toner image transferred onto the surface of the recording medium.

20. An electrostatic image forming method comprising:

charging a surface of an image holding member;

forming an electrostatic image on the charged surface of the image holding member;

developing the electrostatic image formed on the surface of the image holding member with the electrostatic image developer according to claim 17 to thereby form a toner image;

transferring the toner image formed on the surface of the image holding member onto a surface of a recording medium; and fixing the toner image transferred onto the surface of the recording medium.

* * * * *